(12) United States Patent
Hakii et al.

(10) Patent No.: US 8,049,948 B2
(45) Date of Patent: Nov. 1, 2011

(54) PROCESS FOR PRODUCING ELECTROCHEMICAL DISPLAY ELEMENT AND ELECTROCHEMICAL DISPLAY ELEMENT

(75) Inventors: Takeshi Hakii, Sagamihara (JP); Tomoo Izumi, Toyonaka (JP)

(73) Assignee: Konica Minolta Holdings, Inc., Tokyo (JP)

(*) Notice: Subject to any disclaimer, the term of this patent is extended or adjusted under 35 U.S.C. 154(b) by 145 days.

(21) Appl. No.: 12/451,821

(22) PCT Filed: Jun. 3, 2008

(86) PCT No.: PCT/JP2008/060194
§ 371 (c)(1),
(2), (4) Date: Dec. 2, 2009

(87) PCT Pub. No.: WO2008/149850
PCT Pub. Date: Dec. 11, 2008

(65) Prior Publication Data
US 2010/0134864 A1 Jun. 3, 2010

(30) Foreign Application Priority Data
Jun. 8, 2007 (JP) ................................ 2007-152447

(51) Int. Cl.
*G02F 1/153* (2006.01)
*B05D 5/06* (2006.01)

(52) U.S. Cl. ........ 359/265; 359/270; 359/271; 359/272; 359/274; 359/296; 359/321; 427/64; 427/73; 427/80; 427/81

(58) Field of Classification Search .......... 359/265–275, 359/296, 321; 427/64–73, 80, 81
See application file for complete search history.

(56) References Cited

U.S. PATENT DOCUMENTS

| | | | |
|---|---|---|---|
| 4,141,735 A * | 2/1979 | Schrader et al. | 427/316 |
| 4,240,716 A | 12/1980 | Camlibel et al. | |
| 5,764,401 A | 6/1998 | Udaka et al. | |
| 6,459,418 B1 * | 10/2002 | Comiskey et al. | 359/296 |
| 6,631,022 B1 * | 10/2003 | Kihira et al. | 359/265 |
| 6,995,891 B2 * | 2/2006 | Agrawal et al. | 359/265 |
| 7,072,091 B2 | 7/2006 | Udaka et al. | |

FOREIGN PATENT DOCUMENTS

| | | |
|---|---|---|
| JP | 61-041129 A | 2/1986 |
| JP | 01-230691 A | 9/1989 |
| JP | 06-242474 A | 9/1994 |
| JP | 08-262501 A | 10/1996 |
| JP | 2003-005224 A | 1/2003 |
| JP | 2003-098558 A | 4/2003 |
| JP | 2003-241227 A | 8/2003 |
| WO | WO 2004/067673 A1 | 8/2004 |
| WO | WO 2004/068231 A1 | 8/2004 |

* cited by examiner

*Primary Examiner* — Evelyn A. Lester

(74) *Attorney, Agent, or Firm* — Holtz, Holtz, Goodman & Chick, PC

(57) ABSTRACT

This invention provides a novel process for producing an electrochemical display element, which can easily form a white scattering layer between opposed electrodes, has a high level of suitability for production, and has high stability after long-term use. The production process is characterized in that a film containing a white scattering material and a polymeric binder is formed on at least one electrode in opposed electrodes, the other electrode is disposed so as to face the electrode with film formed thereon, a low-viscosity electrolyte is poured into a space between the opposed electrodes, and the polymeric binder is dissolved in or swollen in the electrolyte to form a gel-like electrolyte layer containing the white scattering material and the polymeric binder within the space.

17 Claims, 3 Drawing Sheets

PROCESS FOR PRODUCING ELECTROCHEMICAL DISPLAY ELEMENT AND ELECTROCHEMICAL DISPLAY ELEMENT

This application is the U.S. national phase application of International Application PCT/JP2008/060194 filed Jun. 3, 2008.

FIELD OF TECHNOLOGY

The present invention relates to a new process for producing an electrochemical display element and an electrochemical display element.

TECHNICAL BACKGROUND

Recently, chance of getting and reading information of documents and images in a form of electronic information simpler than those in a form of usual printed material on paper is more increased accompanied with increasing in the rapidness of the processing speed of personal computer, spreading of network infrastructure and capacity glowing and cost lowering of data storage.

As the means for reading such the electronic information, liquid crystal displays and CRT are usually used and light emission type displays such as an organic electroluminescent are mainly applied recently. However, it is necessary to observe such the reading means for long time, particularly, when the electronic information is information of documents. Such the action is difficultly considered as a gentle means for the human. As the problems of such the light emission type displays, it has been known that eyes are fatigued by flicker, portability is low, posture for reading is limited and focusing on the still image is necessary and electric consumption is increased accompanied with prolongation of the reading time.

Although memory type reflective displays utilizing outside light which do not consume electric power for sustaining the image have been known as the means for compensating such the defects, such the displays are difficultly considered to have sufficient properties in the present condition by the following reasons.

In the system using a polarizing plate such as a reflective liquid crystal plate, the reflectivity is low as about 40% so that display of white image is insufficiently and majority of the production methods to be used for producing the constituting parts of the display is not always simple is utilized. A polymer dispersion type liquid crystal requires high voltage and the contrast of the obtained image is not insufficient since difference of between the refractive indexes of organic compounds. A polymer network type liquid crystal has problems that high voltage is required and a complex TFT circuit is necessary for improving the memorizing ability. A displaying element using electrophoresis requires high voltage such as 10 V or more and has anxiety about lowering in the durability caused by coagulation of the electrophoresis particles.

An electrochromic displaying element, hereinafter referred to as EC system, or an electro-deposition system, hereinafter referred to as ED system, applying the dissolution-deposition of metal or metal salt has been known as a method for dissolving such the problems of each of the above systems. The EC system has advantages such as that the element can be driven at low voltage such as 3 V or less, the full color image can be displayed, the structure of the cell is simple, and the quality of white image is high. The ED system has advantages such as that the element can be driven at low voltage such as 3 V or less, the structure of the cell is simple, the contrast of black and white in the image is suitable and the quality of black image is high, and various methods are disclosed; cf. Patent Documents 1 to 5, for example.

As a result of detailed investigation on the technology disclosed in the above Patent Documents by the inventors, it is found that an unevenness on the displayed image occurs during repeating use of the prolong time. As means for solving this defect, to utilize high viscosity by gelling a electrolyte or a polymer binder is investigated, however, it is found that by using a gel electrolyte or high viscous electrolyte, general method for producing a display element such as LCD cannot be applied as it is.

For example, in a liquid crystal injection method known as a general method for producing LCD, problems occurs such that long time is needed to injection and an unfilled room remains during injection by using a gel electrolyte or a high viscous electrolyte. A liquid crystal dropping method recently prevailed in method for producing a large size LCD is a proper method to fill a gel electrolyte or a high viscous electrolyte into a cell, however, effective methods for deciding a gap between opposed electrodes cannot be founded. By a method for deciding gap by photo spacer, for example, a high aspect ratio cannot be obtained because of a durability of a spacer. As a result, a problem of lowering an open ratio of a display area remained. Other method comprising steps: mixing spacer which decides a gap in an electrolyte, dropping an electrolyte by dispenser to form electrolyte layer is known. However, it is found that problems of lowering a curing of a sealing agent or lowering an adhesion remained, because an incompletely cured curing agent contacts with an electrolyte layer.

A method for filling an electrolyte having low viscosity into a cell and gelling an electrolyte by cross linking an electrolyte after filling into a cell is disclosed in Patent Document 6.

However, as a result of detailed investigation on the technology disclosed in the above Patent Documents, it is found that there are still problems such that a cross linking is gradually proceeding after producing an element, or display properties vary because of forming byproducts.

Patent Document 1: International Patent No. 2004/068231
Patent Document 2: International Patent No. 2004/067673
Patent Document 3: U.S. Pat. No. 4,240,716
Patent Document 4: Japanese Registration Patent No. 3428603
Patent Document 5: Japanese Patent Publication Open to Public Inspection (hereinafter referred to as JP-A) No. 2003-241227
Patent Document 6: Japanese Registration Patent No. 3804822

SUMMARY

Problems to be Solved by the Present Invention

An object of the present invention is to provide a new method for producing an electrochemical display element which can form easily a white scattering material layer between opposed electrodes, and exhibits high production efficiency and a high stability with long-term usage.

Means to Solve the Problems

Above objects can be solved by the constitution below:
1. A process for producing an electrochemical display element comprising steps of:
forming a film containing a white scattering material and a polymeric binder on at least one electrode in opposing electrodes,
disposing the other electrode so as to face the electrode with film formed thereon,
pouring a low-viscosity electrolyte into a space between the opposed electrodes,
and dissolving or swelling the polymeric binder in the electrolyte to form a gel electrolyte layer containing the white scattering material and the polymeric binder within the space.
2. The process for producing an electrochemical display element of item 1, wherein the film which comprises the white scattering material and the polymeric binder is formed from a pasting liquid comprising the white scattering material, the polymeric binder and a solvent.
3. The process for producing an electrochemical display element of item 2, wherein the film containing a white scattering material and a polymeric binder is formed by a step comprising at least one method of a coating method, an inkjet method, a printing method and a dispensing method.
4. The process for producing an electrochemical display element of item 2 or 3, comprising steps of:
evaporating a solvent from the film formed by the pasting liquid; and then pouring a low-viscosity electrolyte.
5. The process for producing an electrochemical display element of item 4, comprising steps of:
evaporating a solvent from the film formed by the pasting liquid;
forming a seal portion by printing a heat curable or ultraviolet ray curable resin around at least one electrode in opposed electrodes;
sticking the opposed electrodes;
forming a cell by curing; and
pouring a low-viscosity electrolyte.
6. The process for producing an electrochemical display element of any one of items 1 to 5, wherein the film containing a white scattering material and a polymeric binder is porous.
7. The process for producing an electrochemical display element of any one of items 1 to 6, wherein the film containing a white scattering material and a polymeric binder is patterned.
8. The process for producing an electrochemical display element of any one of items 1 to 7, wherein the polymeric binder is a butyral resin.
9. The process for producing an electrochemical display element of item 8, wherein a number of a PVA group represented by (A) of the butyral resin is in the range of 15% or more to 25% or less of a sum number of a PVAc group represented by (B) and PVB group represented by (C):

(A) PVA Group

—$CH_2$—$CH(OH)$—

(B) PVAc Group

—$CH_2$—$CH(OCOCH_3)$—

(C) PVB Group

—$CH_2$—$CHCH_2$—$CH$—
   \       /
   $OCH$—$O$
     |
    $C_3H_7$

10. The process for producing an electrochemical display element of item 8 or 9, wherein an average degree of polymerization of the butyral resin is in the range of 400 to 800.
11. An electrochemical display element produced by the process of any one of items 1 to 10.
12. The electrochemical display element of item 11, wherein the gel-like electrolyte layer contains a carboxylic acid ester compound.
13. The electrochemical display element of item 11 or 12, wherein the gel-like electrolyte layer contains silver or a compound having silver in a chemical structure; and the opposed electrodes is driven so as to cause a dissolution and a precipitation of silver.
14. The electrochemical display element of item 13, wherein the gel-like electrolyte layer contains at least one of a compound represented by Formula (1) or Formula (2):

$$R_1—S—R_2 \quad \text{Formula (1)}$$

wherein $R_1$ and $R_2$ each represent a substituted or an unsubstituted hydrocarbon group, provided that an aromatic group is not included when $R_1$ and $R_2$ each forms a ring having S atom;

$$\text{Formula (2)}$$

$MS$—$N$—$(R_3)_{n1}$ with Z heterocyclic ring wherein M represents a hydrogen atom, metal atom or a tertiary ammonium, Z represents a heterocyclic ring excluding an imidazole rings, n represents an integer of 0 to 5, R3 represents a hydrogen atom, a halogen atom, an alkyl group, an alkyl carbonamide group, an aryl carbonamide group, an alkyl sulfonamide group, an aryl sulfonamide group, an alkoxy group, an aryloxy group, an alkylthio group, an alkyl carbamoyl group, an aryl carbamoyl group, a carbamoyl group, an alkyl sulfamoyl group, an aryl sulfamoyl group, a sulfamoyl group, a cyano group, an alkyl sulfonyl group, an aryl sulfonyl group, an alkoxy carbonyl group, an aryloxy carbonyl group, an alkyl carbonyl group, an aryl carbonyl group, an acyloxy group, a carboxyl group, a carbonyl group, a sulfonyl group, an amino group, a hydroxyl group, or a heterocyclic group; when n is 2 or more, each R3 may be the same or different and may be joined to form a condensed ring.
15. The electrochemical display element of item 13 or 14, wherein Equation (1) is satisfied:

$$0 \leq [X]/[Ag] \leq 0.01 \quad \text{Equation (1)}$$

wherein [X] (mol/kg)-represents a molar concentration of a halogen ion or a halogen atom contained in the gel-like electrolyte layer, and [Ag] (mol/kg) represents a molar concentration of a silver or a compound having silver in a chemical structure in the gel-like electrolyte layer.
16. The electrochemical display element of any one of items 13 to 15, wherein an electrochromic compound, a silver chloride compound and the white scattering material are included in the gel-like electrolyte layer between opposed electrodes, and substantive multi color of three colors or more comprising black, white and colored display other than black is displayed by a driving operation of the opposed electrodes.

17. The electrochemical display element of item 16, comprising the electrochromic compound represented by Formula (3):

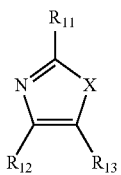

Formula (3)

wherein $R_{11}$ represents a substituted or unsubstituted aryl group, $R_{12}$ and $R_{13}$ each represents a hydrogen atom or a substituent, X represents $>N-R_{14}$, an oxygen atom or a sulfur atom, $R_{14}$ represents a hydrogen atom or a substituent.

Effect of the Invention

According to the present invention, the new electrochemical display element having high stability during use of the prolong time, and a high production efficiency.

Figure 1A:
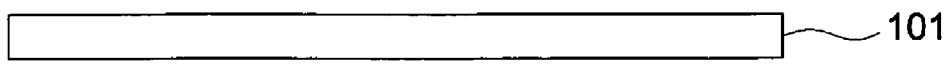
FIG. 1 shows an example of the production process for producing the electrochemical display element of the present invention.

DESCRIPTION OF THE ALPHANUMERIC DESIGNATIONS 101, 102: opposed electrodes
103: film containing a white scattering material and a polymeric binder
104: sealing agent
105: gel electrolyte layer
110: white scattering material
111: polymeric binder
112: hole

THE BEST EMBODIMENT FOR EMBODYING THE INVENTION

The best embodiment for embodying the present invention is described in detail below.

The present invention is characterized by: preliminary forming a film containing a white scattering material and a polymeric binder on at least one electrode in opposing electrodes, filling up the electrolyte having low viscosity without or less polymeric binder into the cell via the liquid crystal injection method, and gelling the electrolyte through solving or swelling the polymer binder which was filled into the cell, and to form the electrochemical display element inhibiting an unevenness of display with long-term usage.

The method of producing the electrochemical display element of the present invention will be described by using figures.

FIGS. 1 to 6 are figures showing an example of the production process for producing the electrochemical display element by:

forming a film containing a white scattering material,
pouring a low-viscosity electrolyte into a cell between disposing the opposed electrodes,
and gelling the electrolyte through dissolving or swelling the polymeric binder by the electrolyte.

FIG. 1 shows an example of the production process for producing the electrochemical display element of the present invention.

FIG. 1a shows one of the opposed electrode 101.

Figure 1B:

FIG. 1b shows a process for coating a pasting liquid comprising the white scattering material, the polymeric binder and a solvent on the electrode 101 to form a film 103 containing a white scattering material and a polymeric binder.

Figure 1C:
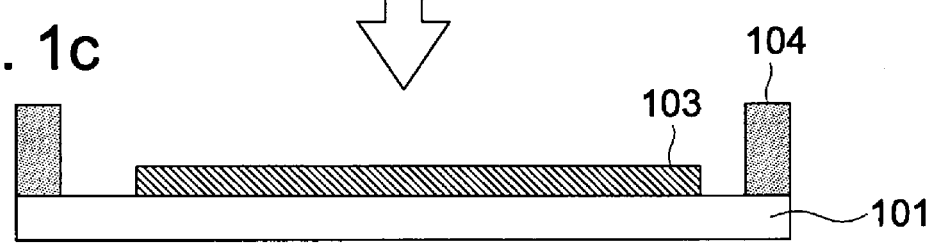

FIG. 1c shows a process for printing a sealant around the opposed electrode 101.

Figure 1D:
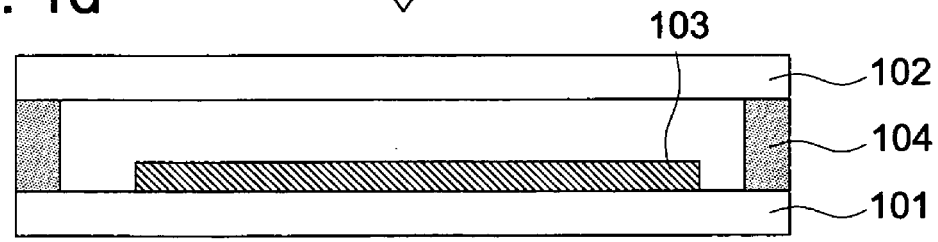

FIG. 1d shows a process for forming a space (cell) by sticking the other opposed electrode 102 onto the opposed electrode 101.

Figure 1E:
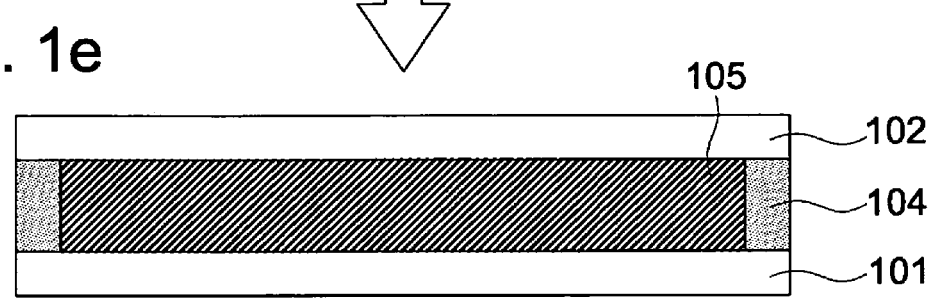

FIG. 1e shows a process for forming the gel electrolyte layer 105 by pouring a low-viscosity electrolyte and dissolving or swelling the polymeric binder in the electrolyte to form a gel electrolyte layer 105 containing the white scattering material and the polymeric binder.

FIG. 2 is schematic figure showing an example of porous film 103 containing a white scattering material and a polymeric binder formed from a pasting liquid.

Figure 2A:
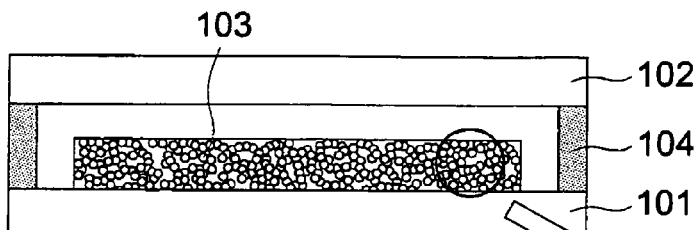
FIG. 2 is schematic figure showing an example of porous layer containing a white scattering material and a polymeric binder formed from a pasting liquid of the present invention.

FIG. 2a shows the film 103 containing the white scattering material and the polymeric binder formed from a pasting liquid.

Figure 2C:
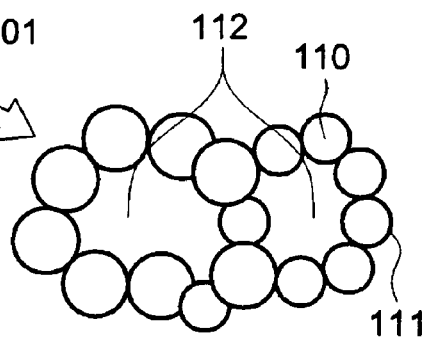

FIG. 2c is a magnified view of the circle shown in FIG. 2a and shows a lot of pore 112 formed by a white scattering material 110 and a polymeric binder 111.

Figure 2B:
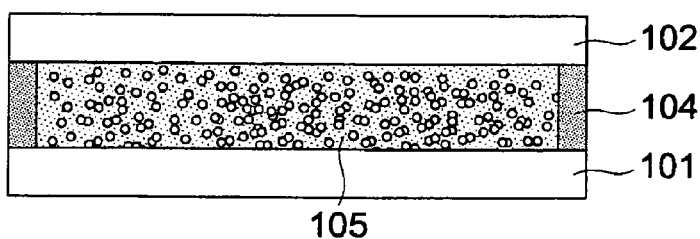

FIG. 2b shows the gel electrolyte layer 105 can be formed in a short period of time by pouring a low-viscosity electrolyte and by dissolving or swelling the polymeric binder by the electrolyte quickly filled into the porous portion.

Figure 3:
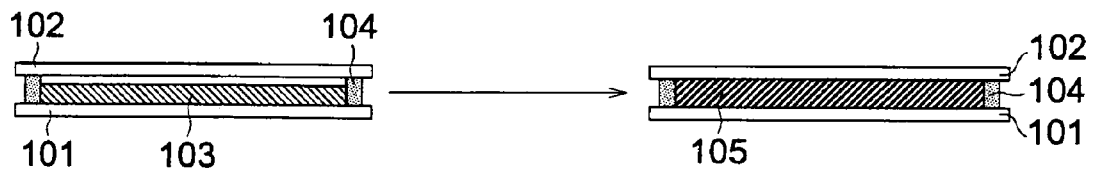
FIG. 3 is a cross-sectional view showing an example of a uniform film containing a white scattering material and a polymeric binder of the present invention.

FIG. 3 shows a process for obtaining the gel electrolyte layer 105 by pouring a low-viscosity electrolyte, and dissolving or swelling the polymeric binder via heating as appropriate after forming a uniform film 103 containing a white scattering material and a polymeric binder.

Figure 4:
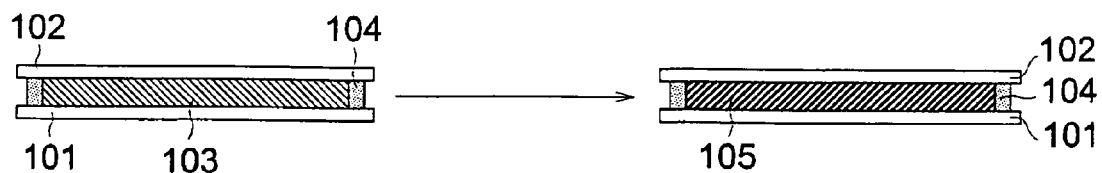
FIG. 4 is a cross-sectional view showing an example of a porous film containing a white scattering material and a polymeric binder of the present invention.

FIG. 4 shows that the film 103 containing a white scattering material and a polymeric binder forms the porous layer, and the gel electrolyte layer 105 can be obtained as the same manner as FIG. 3.

Figure 5:
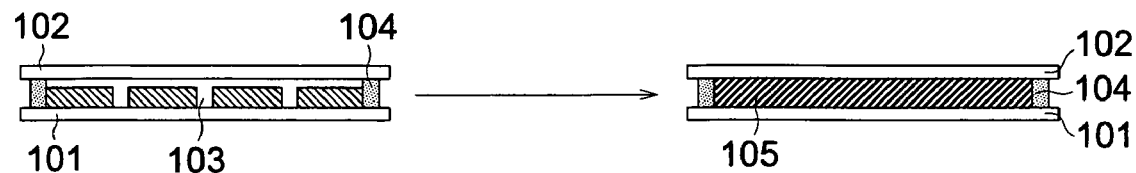
FIG. 5 is a cross-sectional view showing an example of a patterning film containing a white scattering material and a polymeric binder of the present invention.

FIG. 5 shows the film 103 containing a white scattering material and a polymeric binder is patterning, and then the gel electrolyte layer 105 can be obtained as the same manner.

FIG. 6 is a plain view showing a patterning example of FIG. 5.

Figure 6A:
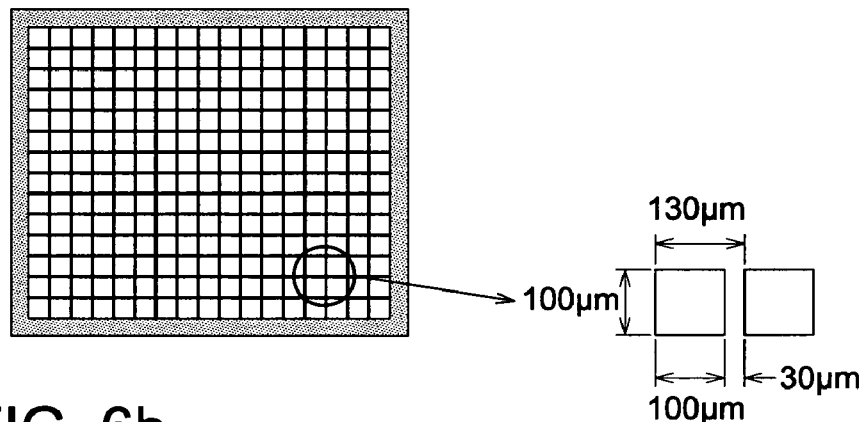
FIG. 6 is a plain view showing an example of a porous film containing a white scattering material and a polymeric binder of the present invention.

FIG. 6a shows an example of grid patterned film containing a white scattering material and a polymeric binder formed by a screen printing.

Figure 6B:
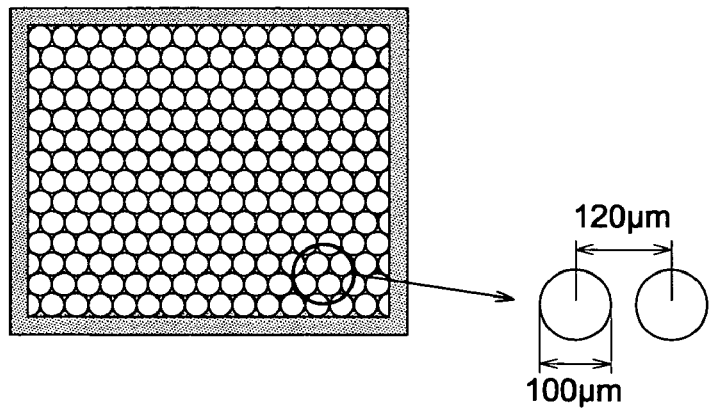

FIG. 6b shows an example of circular patterned film formed by inkjet or dispenser.

The electrochemical display element of the present invention is described in detail below.

[Electrolyte]

"Electrolyte" of the present invention generally refers to as a material (hereinafter refer to as "narrowly-defined electrolyte") which can be solved in a solvent such as water and the solution thereof exhibits ion conductivity. "Electrolyte" of the present invention further includes a mixture including other metal and compound whether electrolyte or non-electrolyte as narrowly-definition (hereinafter refer to as "electrolyte in the broad sense of the term").

Electrolyte relating to the present invention existing between the opposed electrodes is composed by selecting appropriately from organic solvent, ionic liquid, active substance for oxidation-reduction, supporting electrolyte, complexing agent, white scattering material and polymeric binder.

Each constituent element of the electrolyte according to the present invention is described in detail below.

(Low-Viscosity Electrolyte, Gel Electrolyte)

The electrolyte is usually classified into a liquid electrolyte and a polymer electrolyte. The polymer electrolyte is further classified into a solid electrolyte substantially composed of a solid compound and a gel electrolyte composed of a polymer compound and a liquid electrolyte. From the view point of fluidity, the solid electrolyte substantially has no fluidity and the gel electrolyte has middle fluidity between the liquid electrolyte and the solid electrolyte.

Accordingly, the gel electrolyte in the present invention is an electrolyte liquid having high viscosity and fluidity at room temperature, for example, the electrolyte having a viscosity of from 100 mPa·s to 1,000 mPa·s at 25° C. The gel electrolyte in the present invention is not necessary always to have thermal sol-gel reversible changing ability.

The gel electrolyte having low viscosity of the present invention is the electrolyte having a viscosity of from 0.1 mPa·s to 100 mPa·s at 25° C. and having high fluidity. For example, a content of the polymer binder based on an electrolyte solvent is preferably 10%, or less by weight.

(White Scattering Material)

The electrolyte layer of the present invention contains a white scattering material. The white scattering material related to the present invention is a material capable of displaying white color by adding into the electrolyte layer and is preferably an inorganic material and more preferably a metal oxide. As the metal oxide, titanium dioxide (anatase type and rutile type), barium sulfate, calcium carbonate, aluminum oxide, zinc oxide, magnesium oxide, zinc hydroxide, magnesium hydroxide, magnesium phosphate, magnesium hydrogen phosphate, an alkaline earth metal salt, talc, kaolin, zeolite, acid clay and glass can be exemplified.

As the organic compound, polystyrene, an acryl resin, an ionomer, an ethylene-vinyl acetate copolymer resin, a benzoguanamine resin, a urea-formalin resin, a melamine-formalin resin, and a polyamide resin may be used singly, in a mixed state or in particle state having voids therein for varying the refractive index.

In the present invention, titanium dioxide, zinc oxide, and zinc hydroxide are preferable among the above white scattering materials and titanium dioxide is particularly preferably used from the viewpoint of coloring prevention at high temperature and the reflectance of the element caused by the refractive index. Moreover, titanium dioxide is preferably one treated by an inorganic oxide such as $Al_2O_3$ and $SiO_2$ on the surface thereof.

(Polymeric Binders)

The polymeric binders applicable to the electrolyte of the present invention is preferably selected from various polymer material such as butyral resin, polyacetal resin, polyvinyl alcohol, polyethyleneglycol, and polyvinylidene fluoride from the viewpoint of a properties of electrochemical display element and viscosity of a electrolyte.

Though the butyral resin capable of being applied to the electrolyte of the present invention is not specifically limited, a butyral resin in which the number of PVA group represented by the foregoing (A) is preferably within the range of from 15% to 25% of the total number of 1) the PVA group, 2) PVAc group represented by foregoing (B) and 3) PVB group represented by the foregoing (C), from the standpoint of enhancing the effect of the object of the present invention.

Specific examples of the butyral resin usable in the electrolyte relating to the present invention include #3000-1, #3000-2, #3000-4, #3000-K, #4000-2, #5000-A, #5000-D, #6000-C, #6000-AS and #6000-CS, each manufactured by Denki Kagaku Kogyo K.K., and S-LEC series manufactured by Sekisui Chemical Co. Lid.

(Pasting Liquid)

The pasting liquid relating to the present invention can be formed by adding a polymeric binder to a solvent, then adding a white scattering material to the solution thereof by dissolving by heating and dispersing by a wet type fine crushing disperser such as a ultrasonic disperser and a beads mill.

In the case of using butyral resin as polymeric binder relating to the present invention, the weight ratio of the organic solvent to the butyral resin is preferably within the range of from 10:1 to 2:1, and more preferably from 10:1 to 10:3. An organic solvent may be selected from alcohols, esters, and glycol ethers.

In the present invention, the weight ratio of the solvent to the white scattering material is preferably within the range of from 10:1 to 1:1, and more preferably from 5:1 to 5:4.

The white scattering material relating to the present invention is preferably added after dissolving the butyral resin in the organic solvent or the ionic liquid.

Additives such as leveling agent, surfactant may be added to the pasting liquid to the present invention.

(Organic Solvent for Electrolyte)

The organic solvent capable of being applied to the electrolyte relating to the present invention preferably has boiling point within the range of from 120° C. to 300° C., which can be remaining in the electrolyte layer without evaporation after the formation of the electrolyte layer. As examples of the organic solvent, propylene carbonate, ethylene carbonate, ethyl methyl carbonate, diethyl carbonate, dimethyl carbonate, butylene carbonate, γ-butylactone, tetramethylurea, sulfolane, dimethylsulfoxide, 1,3-dimethyl-2-imidazolidinone, 2-(N-methyl)-2-pyrrolidinone, hexamethylphosphortriamide, N-methylpropionamide, N,N-dimethylacetamide, N-methylacetamide, N,N-dimethylformamide, N-methylformamide, butylonitrile, propiontrile, acetylacetone, 4-methyl-2-pentanone, acetic anhydride, dimethoxiethane, diethoxyfuran, tetrahydrofuran, ethylene glycol, diethylene glycol, triethylene glycol monobutyl ether, tricrezyl phosphate, 2-ethylhexyl phosphate, dioctyl phthalate, and dioctyl cebacate can be cited.

Among the above organic solvents, carbonic acid ester compounds are preferable such as propylene carbonate, ethylene carbonate, ethyl methyl carbonate, diethyl carbonate, dimethyl carbonate, butylene carbonate, and γ-butylactone.

As examples of another solvent usable in the present invention, the compounds described in J. A. Riddick, W. B. Bunger, T. K. Sakano, "Organic Solvent", $4^{th}$ ed., John Wiley & Sons (1986), Y. Marcus, "Ion Solvation", John Wiley & Sons (1985), C. Reichardt, "Solvents and Solvent Effects in Chemistry" $2^{nd}$ ed., VCH (1988), G. J. Janz, R. P. T. Tomkins, "Nonaqueous Electrolytes Handbook" Vol. 1, Academic Press (1972) are cited.

(Ionic Liquid)

Ionic liquid may be added to the electrolyte layer relating to the present invention. Ionic liquid relating to the present invention is the salt existing in a liquid state at room temperature and may be selected from a combination of cation such as imidazolium and pyridinium, and anion such as fluorine ion or triflate.

(Spacer)

According to the electrochemical display element relating to the present invention, spacer may be added to the electrolyte. Spacer relating to the present invention is fine particles for controlling a gap between opposed electrodes. For example, fine sphere made from glass or acryl resin can be usable. From a view point of stability of dispersion in the electrolyte, printing properties and performances of the electrochemical display element, an average particle diameter is preferably in the range of 10 μm and 50 μm.

Porous state relating to the present invention is defined as a state below:

after forming a porous white scattering material, then a low-viscosity electrolyte containing silver or compound having silver is poured on the white scattering material, the electrolyte can flow into the porous portion and give potential difference between opposed electrodes, cause a solution-deposition reaction of silver and ion species can move and pass through between electrodes.

<<Silver or Compound Containing Silver in the Chemical Structure Thereof>>

The silver and the compound containing silver in the chemical structure thereof relating to the present invention is the general term of compounds such as silver oxide, silver sulfide, metallic silver, silver colloid particles, silver halide, silver complex compounds and silver ions, and the state of phase such as a solid state, solubilized state or vaporized state or the state of charges such as neutral, anionic or cationic is not specifically limited.

The concentration of silver ion contained in the electrolyte relating to the present invention is preferably 0.2 moles/kg≦ [Ag]≦2.0 moles/kg. When the silver ion concentration is lower than 0.2 moles/kg, the silver solution is made to dilute and the deriving speed is lowered. When the silver ion concentration is higher than 2.0 moles/kg, the solubility is lowered and the deposition tends to be caused during the storage at low temperature. Therefore, such the conditions are disadvantageous.

(Compound Represented by Formula (1) and (2))

It is preferable to employ at least one of the compounds represented by Formula (1) or (2) in the display element of the present invention.

In above Formula (1), $R_1$ and $R_2$ each represent a substituted or unsubstituted hydrocarbon group, which includes an aromatic straight chain group or branched chain group. Further, these hydrocarbon groups may contain at least one of a nitrogen atom, an oxygen atom, a phosphorous atom, a sulfur atom, and a halogen atom. However, when a ring containing an S atom is formed, no aromatic group is employed.

Listed as a substitutable group to the hydrocarbon group may, for example, be an amino group, a guanidino group, a quaternary ammonium group, a hydroxyl group, a halogen compound, a carboxyl group, a carboxylate group, an amido group, a sulfinic acid group, a sulfonic acid group, a sulfate group, a phosphonic acid group, a phosphate group, a nitro group, and a cyano group.

It is necessary to have silver solubilized in an electrolyte in order to result in dissolution and deposition of silver in general. Namely, it is common to employ a method in which silver or silver-containing compound is modified to be soluble compound via coexistence of a compound containing chemical structure species which result in mutual interaction with silver, which forms a coordination bond with silver or forms a weak covalent bond with silver. Known as the above chemical structure species are a halogen atom, a mercapto group, a carboxyl group, an imino group and so on. In the present invention, a thioether group also usefully acts as a silver solvent and exhibits features such as minimal effects to coexisting compounds and high solubility in solvents.

Specific examples of the compounds represented by Formula (3) according to the present invention will now be cited, however the present invention is not limited to the exemplified compounds.

1-1: $CH_3SCH_2CH_2OH$
1-2: $HOCH_2CH_2SCH_2CH_2OH$
1-3: $HOCH_2CH_2SCH_2CH_2SCH_2CH_2OH$
1-4: $HOCH_2CH_2SCH_2CH_2SCH_2CH_2SCH_2CH_2OH$
1-5: $HOCH_2CH_2SCH_2CH_2OCH_2CH_2OCH_2CH_2SCH_2CH_2OH$
1-6: $HOCH_2CH_2OCH_2CH_2SCH_2CH_2SCH_2CH_2OCH_2CH_2OH$
1-7: $H_3CSCH_2CH_2COOH$
1-8: $HOOCCH_2SCH_2COOH$
1-9: $HOOCCH_2CH_2SCH_2CH_2COOH$
1-10: $HOOCCH_2SCH_2CH_2SCH_2COOH$
1-11: $HOOCCH_2SCH_2CH_2SCH_2CH_2SCH_2CH_2SCH_2COOH$
1-12: $HOOCCH_2CH_2SCH_2CH_2SCH_2CH(OH)CH_2SCH_2CH_2SCH_2CH_2COOH$
1-13: $HOOCCH_2CH_2SCH_2CH_2SCH_2CH(OH)CH(OH)CH_2SCH_2CH_2SCH_2CH_2COOH$
1-14: $H_3CSCH_2CH_2CH_2NH_2$
1-15: $H_2NCH_2CH_2SCH_2CH_2NH_2$
1-16: $H_2NCH_2CH_2SCH_2CH_2SCH_2CH_2NH_2$
1-17: $H_3CSCH_2CH_2CH(NH_2)COOH$
1-18: $H_2NCH_2CH_2OCH_2CH_2SCH_2CH_2SCH_2CH_2OCH_2CH_2NH_2$
1-19: $H_2NCH_2CH_2SCH_2CH_2OCH_2CH_2OCH_2CH_2SCH_2CH_2NH_2$
1-20: $H_2NCH_2CH_2SCH_2CH_2SCH_2CH_2SCH_2CH_2SCH_2CH_2NH_2$
1-21: $HOOC(NH_2)CHCH_2CH_2SCH_2CH_2SCH_2CH_2CH(NH_2)COOH$
1-22: $HOOC(NH_2)CHCH_2SCH_2CH_2OCH_2CH_2OCH_2CH_2SCH_2CH(NH_2)COOH$
1-23: $HOOC(NH_2)CHCH_2OCH_2CH_2SCH_2CH_2SCH_2CH_2OCH_2CH(NH_2)COOH$
1-24: $H_2N(O=)CCH_2SCH_2CH_2OCH_2CH_2OCH_2CH_2SCH_2C(=O)NH_2$
1-25: $H_2N(O=)CCH_2SCH_2CH_2SCH_2C(O=)NH_2$
1-26: $H_2NHN(O=)CCH_2SCH_2CH_2SCH_2C(=O)NHNH_2$
1-27: $H_3C(O=)NHCH_2CH_2SCH_2CH_2SCH_2CH_2NHC(=O)CH_3$
1-28: $H_2NO_2SCH_2CH_2SCH_2CH_2SCH_2CH_2SO_2NH_2$
1-29: $NaO_3SCH_2CH_2CH_2SCH_2CH_2SCH_2CH_2CH_2SO_3Na$ 1-30: H₃CSO₂NHCH₂CH₂SCH₂CH₂SCH₂CH₂NHO₂SCH₃
1-31: H₂N(NH)CSCH₂CH₂SC(NH)NH₂.2HBr
1-32: H₂N(NH)CSCH₂CH₂OCH₂CH₂OCH₂CH₂SC(NH)NH₂.2HCl
1-33: H₂N(NH)CNHCH₂CH₂SCH₂CH₂SCH₂CH₂NHC(NH)NH₂.2HBr
1-34: [(CH₃)₃NCH₂CH₂SCH₂CH₂SCH₂CH₂N(CH₃)₃]²⁺.2Cl⁻

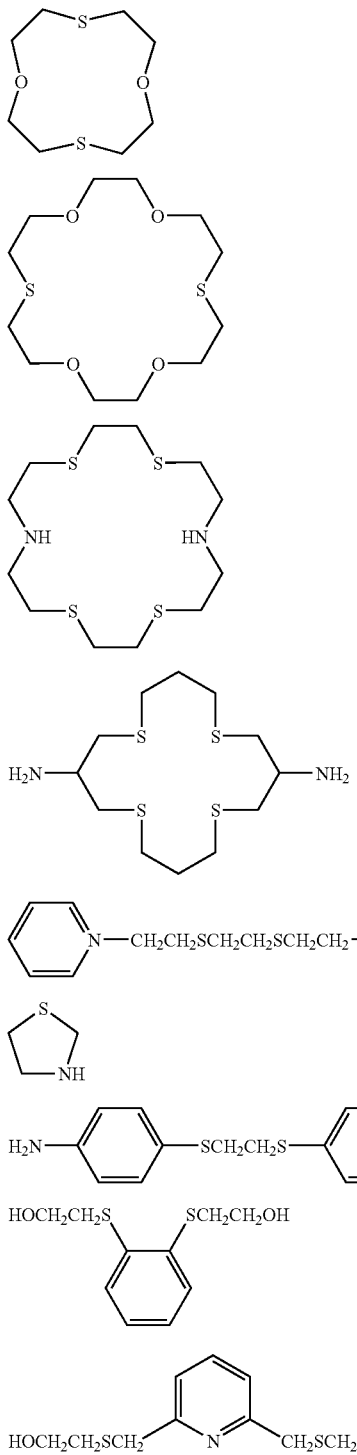

3-35

3-36

3-37

3-38

3-39

3-40

3-41

3-42

3-43

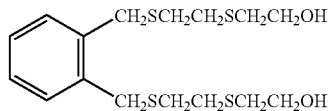

3-44

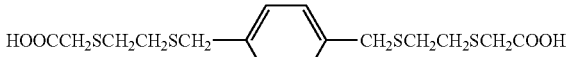

3-45

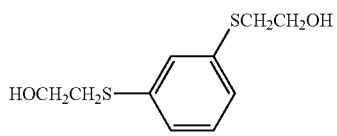

3-46

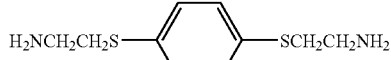

3-47

Compound 1-2 is specifically preferred among the above exemplified compounds in view of realizing the purposes and effects of the present invention.

The compound represented by Formula (2) relating to the present invention is described below.

In the foregoing Formula (2), M is a hydrogen atom, a metal atom or a quaternary ammonium, Z is a nitrogen-containing heterocyclic group except for imidazole rings, n is an integer of from 0 to 5, and $R_3$ is a hydrogen atom, a halogen atom, an alkyl group, an aryl group, an alkylcarbonamido group, an arylcarbonamido group, an alkylsulfonamido group, an arylsulfonamido group, an alkyloxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group or a heterocyclic group, and each of the groups of $R_3$ may be the same as or, different from each other when n is 2 or more and may be bonded with each other for forming a condensed ring.

As examples of the metal atom represented by M in Formula (2), Li, Na, K, Mg, Ca, Zn and Ag are cited. As examples of the quaternary ammonium, $NH_4$, $N(CH_3)_4$, $N(H_4C_9)_4$, $N(CH_3)_3C_{12}H_{25}$, $N(CH_3)_3C_{16}H_{33}$ and $N(CH_3)_3CH_2C_6H_5$ are cited.

As the nitrogen-containing heterocyclic group represented by Z in Formula 1, a tetrazole ring, a triazole ring, an imidazole ring, an oxadiazole ring, a thiadiazole ring, an indole ring, an oxazole ring, a benzoxazole ring, a benzothiazole ring, a benzoselenazole ring and a naphthoxazole ring are cited for example.

As the halogen atom represented by $R_3$ in Formula (2), a fluorine atom, a chlorine atom, a bromine atom and an iodine atom are cited for example. As the alkyl group, a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group and a benzyl group are cited for example. As the aryl group, a phenyl group and a naphthyl group are cited for example. As the alkylcarbonamido group, an acetylamino group, a propionylamino group and butyloylamino group are cited for example. As the arylcarbonamido group, a benzoylamino group is cited for example. As the alkylsulfonamido group, a methanesulfonylamino group and an ethanesulfonylamino group are cited for example. As the arylsulfonamido group, a benzenesulfonylamino group and a toluenesulfonamino group are cited for example. As the aryloxy group, a phenoxy group is cited for example. As the alkylthio group, a methylthio group, an ethylthio group and butylthio group are cited for example. As the arylthio group, a phenylthio group and a tolylthio group are cited for example. As the alkylcarbamoyl group, a methylcarbamoyl group, a dimethylcarbamoyl group, an ethylcarbamoyl group, a diethylcarbamoyl group, a dibutylcarbamoyl group, a piperidylcarbamoyl group and a morphorylcarbamoyl group are cited for example. As the arylcarbamoyl group, a phenylcarbamoyl group, a methylphenylcarbamoyl group, an ethylphenylcarbamoyl group and a benzylphenylcarbamoyl group are cited for example. As the alkylsulfamoyl group, a methylsulfamoyl group, a dimethylsulfamoyl an ethylsulfamoyl group, a diethylsulfamoyl group, a dibutylsulfamoyl group, a piperidylsulfamoyl group and a morphorylsulfamoyl group are cited for example. As the arylsulfamoyl group, a phenylsulfamoyl group, a methylphenylsulfamoyl group, an ethylphenylsulfamoyl group and a benzylphenylsulfamoyl group are cited for example. As the alkylsulfonyl group, a methanesulfonyl group and an ethanesulfonyl group are cited for example. As the arylsulfonyl group, a phenylsulfonyl group, a 4-chlorophenyl-sulfonyl group and a p-toluenesulfonyl group are cited for example. As the alkoxycarbonyl group, a methoxycarbonyl group, an ethoxycarbonyl group and a butoxycarbonyl group are cited for example. As the aryloxycarbonyl group, a phenoxycarbonyl group is cited for example. As the alkylcarbonyl group, an acetyl group, a propionyl group and a butyloyl group are cited for example. As the arylcarbonyl group, a benzoyl group and an alkylbenzoyl group are cited for example. As the acyloxy group, an acetyloxy group, a propionyloxy group and a butyloyloxy group are cited for example. As the heterocyclic group, an oxazole ring, a thiazole ring, a triazole ring, a selenazole ring, a tetrazole ring, an oxadiazole ring, a thiadiazole ring, a thiazine ring, a triazine ring, a benzoxazole ring, benzothiazole ring, an indolenine ring, a benzoselenazole ring, a nephthothiazole ring, triazaindolidine ring, a diazaindolidine ring and a tetrazaindolidine ring are cited for example. These substituents each may have a substituent.

Preferable concrete compounds represented by Formula (2) are shown below though the present invention is not limited to these compounds.

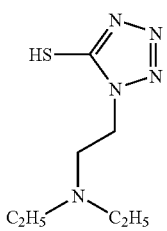

2-1

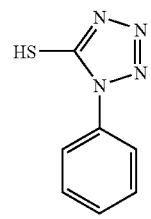

2-2

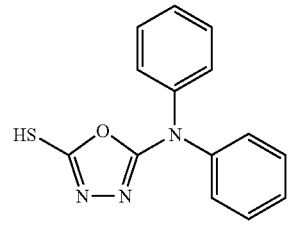

2-3

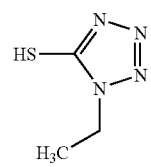

2-4

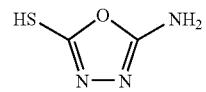

2-5

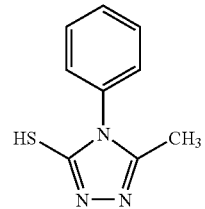

2-6

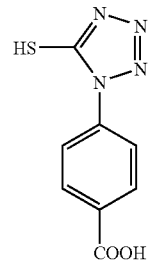

2-7

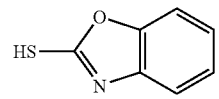

2-8

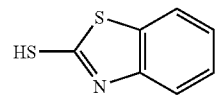

2-9

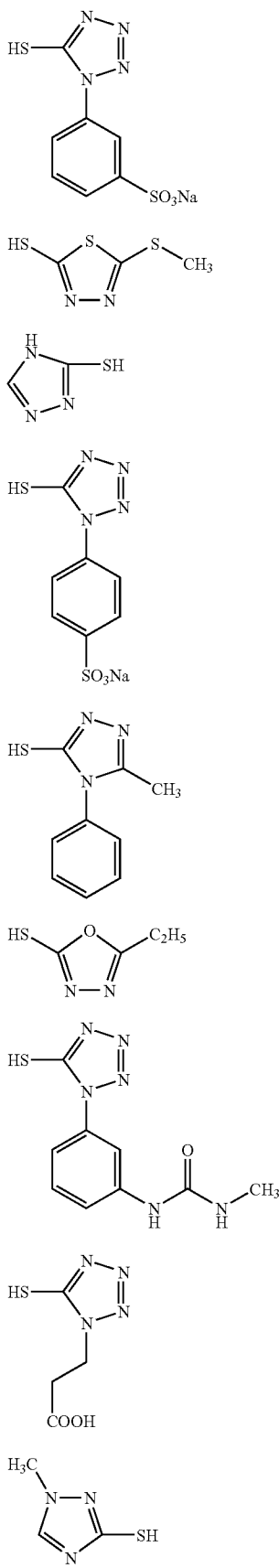

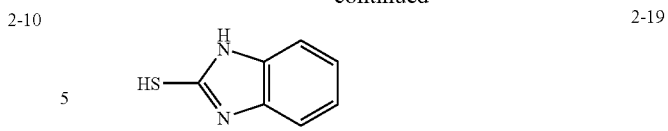

Specifically exemplified compound 2-12 and 2-18 are preferable in the exemplified compounds above, from the viewpoint of satisfactorily exhibiting the object of the present invention.

Further, an electrochromic compound in the present invention represented by foresaid Formula (3) is explained.

In Formula (3), $R_{11}$ represents a substituted or non-substituted aryl group, $R_{12}$, $R_{13}$ each represent a hydrogen atom or a substituent, X represents >N—$R_{14}$, an oxygen atom or a sulfur atom, and $R_{14}$ represents a hydrogen atom or a substituent.

In Formula (3), $R_{11}$ represents a substituted or non-substituted aryl group, $R_{12}$, $R_{13}$ each represent a hydrogen atom or a substituent. Examples of a substituent represented by $R_{11}$, $R_{12}$ or $R_{13}$ include: an alkyl group (for example, a methyl group, an ethyl group, a propyl group, an isopropyl group, a tert-butyl, a pentyl group and a hexyl group), a cycloalkyl group (for example, a cyclohexyl group and a cyclopentyl group), and an alkenyl group, a cycloalkenyl group, an alkynyl group (for example, a propargyl group), a glycidyl group, an acrylate group, a methacrylate group, an aromatic group (for example, a phenyl group, a naphthyl group and an anthracenyl group), a heterocycle group (for example, a pyridyl group, a thiazolyl group, an oxazolyl group, an imidazolyl group, a furyl group, a pyrrolyl group, pyrazinyl group, a pyrimidinyl group, a pyridazinyl group, a selenazolyl group, a thryhorany group, a piperizinyl group, a pyrazolyl group and a tetrazolyl group) an alkoxy group (for example, a methoxy group, an ethoxy group, a propyloxy group, a pentyloxy group, a cyclopentyloxy group, a hexyloxy group and a cyclohexyloxy group), an aryloxy group (for example, phenoxy group), an alkoxycarbonyl group (for example, a methyloxycarbonyl group, an ethyloxycarbonyl group and a butyloxycarbonyl group), an aryloxycarbonyl group (for example, a phenyloxycarbonyl group), a sulfonamide group (for example, a methanesulfonamide group, an ethanesulfonamide group, a butanesulfonamide group, a hexane sulfonamide group, a cyclohexane sulfonamide group and a benzenesulfonamide group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, a phenylaminosulfonyl group and 2-pyridylaminosulfonyl group), a urethane group (for example, a methylureido group, an ethylureido group, and a pentylureido group, a cyclohexylureido group, a phenylureido group and 2-pyridylureido group), an acyl group. (for example, an acetyl group, a propionyl group, a butanoyl group, and a hexanoyl group, a cyclohexanoyl group, a benzoyl and a pyridinoyl group), a carbamoyl group (for example, an aminocarbonyl group, a methylaminocarbonyl group, a dimethylaminocarbonyl group, a propylaminocarbonyl group, a pentylaminocarbonyl group, a cyclohexylaminocarbonyl group, a phenylaminocarbonyl group and a 2-pyridylaminocarbonyl group), an acylamino group (for example, an acetylamino group, a benzoylamino group and a methylureido group), an amide group (for example, an acetamide group, a propioneamide group, a butaneamide group, a hexaneamide group and a benzamide group), a sulfonyl group (for example, a methylsulfonyl group, an ethylsulfonyl group, a butylsulfonyl group, a cyclohexylsulfonyl group, a phenylsulfonyl group and a 2-pyridyl sulfonyl group), a sulfonamide group (for example, a methylsulfonamide group, an octylsulfonamide group, a phenylsulfonamide group and a naphthylsulfonamide group), an amino group (for example, an amino group, an ethylamino group, a dimethylamino group, a butylamino group, a cyclopentylamino group, an anilino group and 2-pyridylamino group), a halogen atom (for example, a chlorine atom, a bromine atom and an iodine atom), a cyano group, a nitro group, a sulfo group, a carboxyl group, a hydroxyl group, a phosphono group (for example, a phosphonoethyl group, a phosphonopropyl group and a phosphonooxyethyl group) and an oxamoyl group. These groups may further be substituted with these groups.

$R_{11}$ is a substituted or unsubstituted aryl group and preferably a substituted or unsubstituted phenyl group and further preferably a substituted or unsubstituted 2-hydroxyphenyl group or 4-hydroxyphenyl group.

$R_{12}$ and $R_{13}$ each are preferably an alkyl group, a cycloalkyl group, an aromatic group or a heterocycle group, more preferably, one of $R_{12}$ and $R_{13}$ is a phenyl group and the other is an alkyl group and further more preferably, both of $R_{12}$ and $R_{13}$ are a phenyl group.

X is preferably >N—$R_{14}$. $R_{14}$ is preferably a hydrogen atom, an alkyl group, an aromatic group, a heterocycle group or an acyl group and more preferably a hydrogen atom, an alkyl group having 1 to 10 carbon atoms, an aryl group having 5 to 10 carbon atoms or an acyl group.

Example of a concrete compound of an electrochromic compound represented by Formula (3) will be shown below, however, the present invention is not limited to these exemplified compounds.

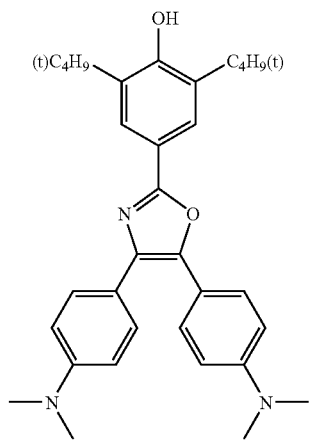

1

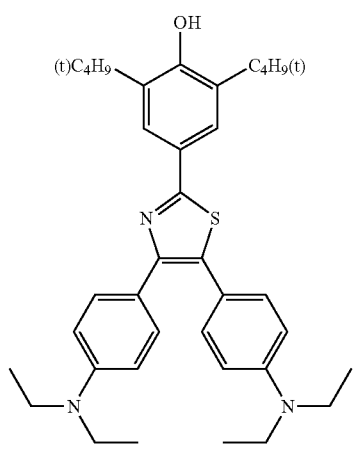

2

3

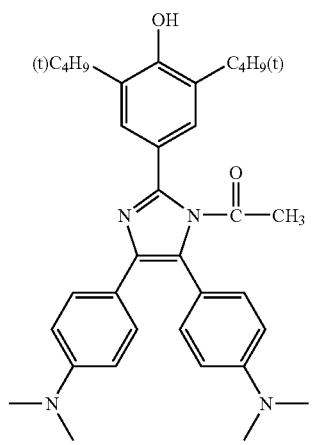

4

| 5 | 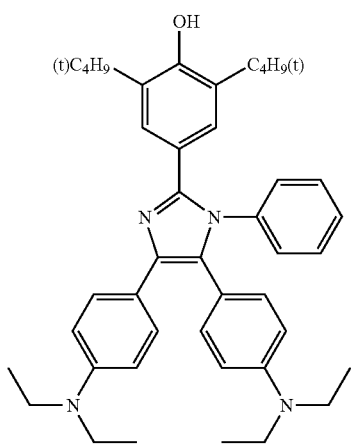 | 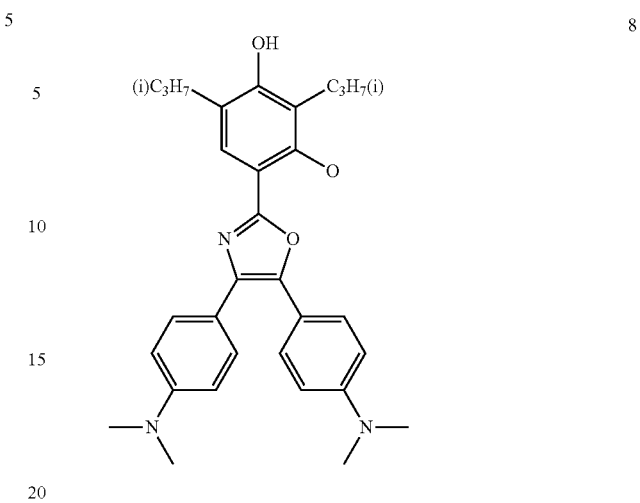 | 8 |
|---|---|---|---|
| 6 | 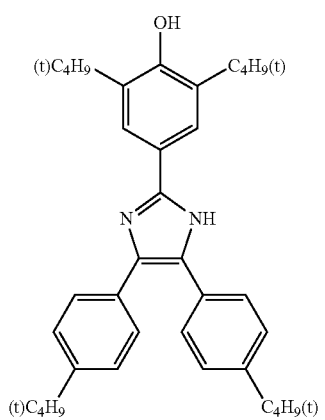 | 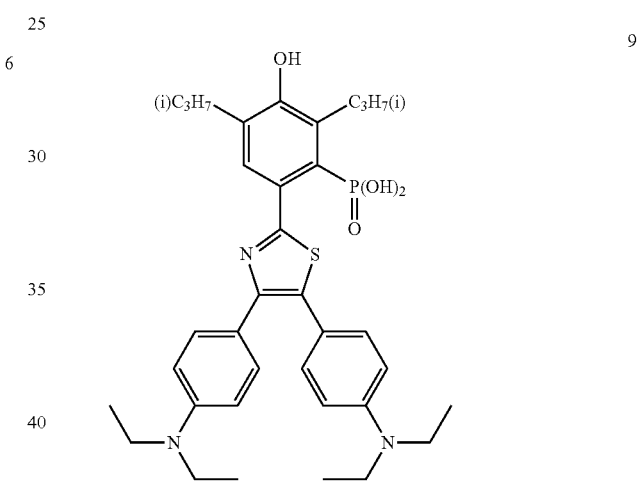 | 9 |
| 7 | 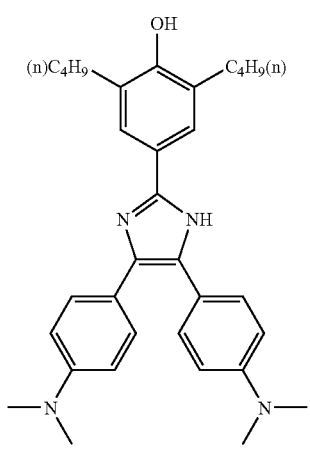 | 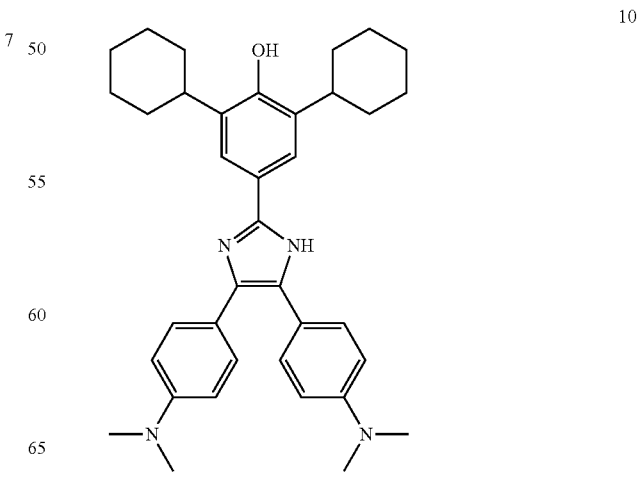 | 10 |

21
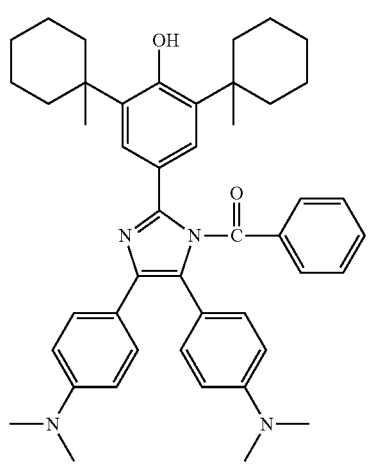
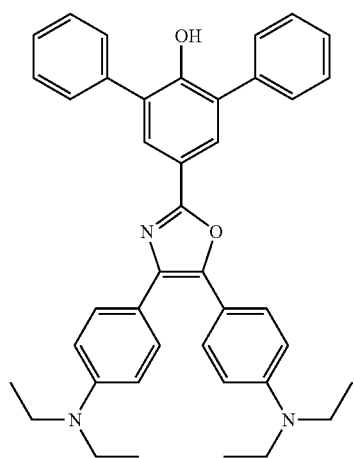
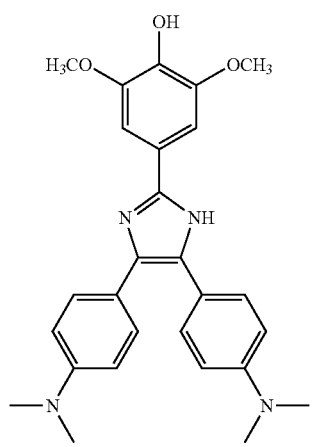
22
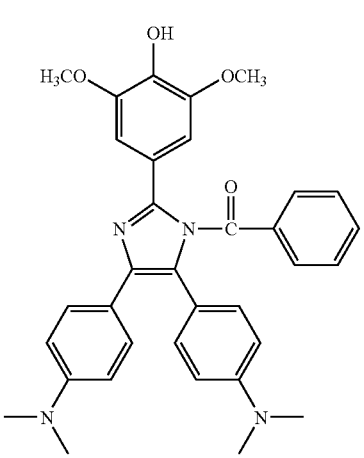
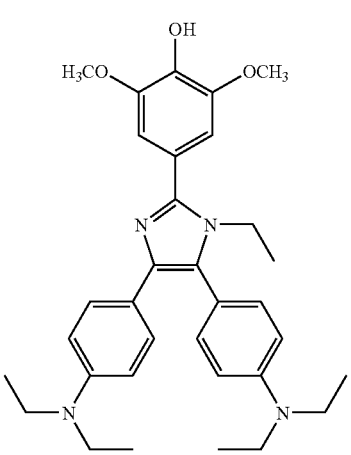
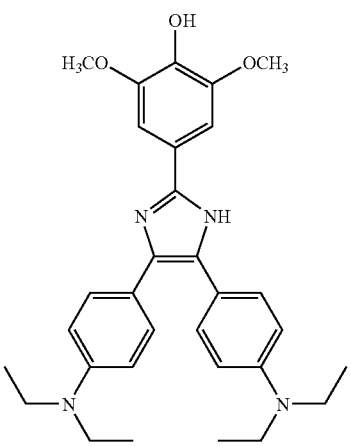

-continued
17
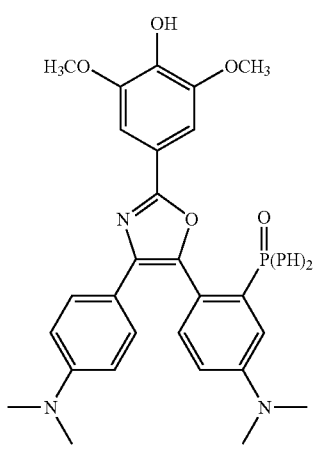
18
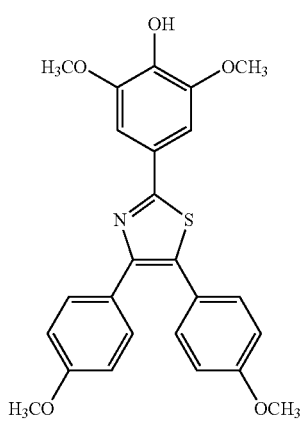
19
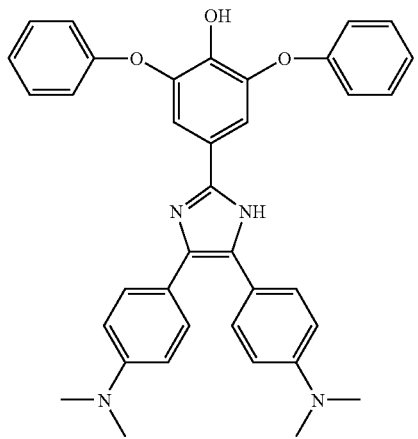
-continued
20
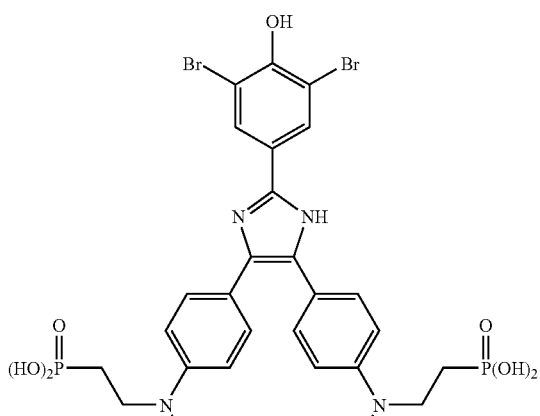
21
22
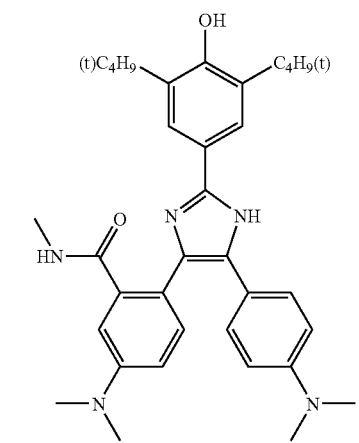

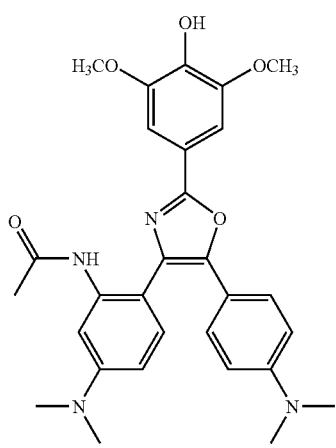
23
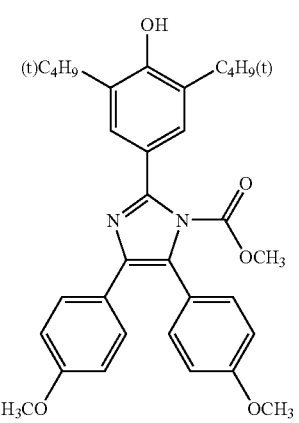
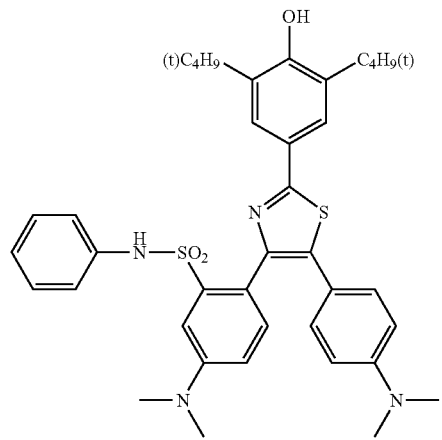
24
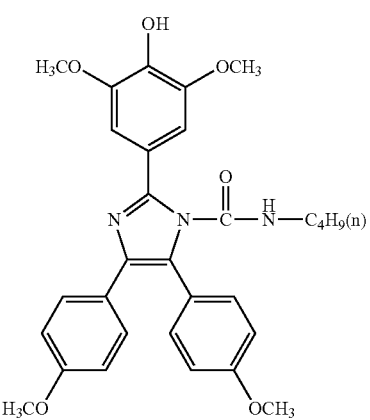
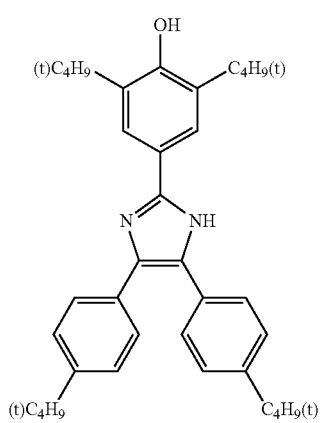
25
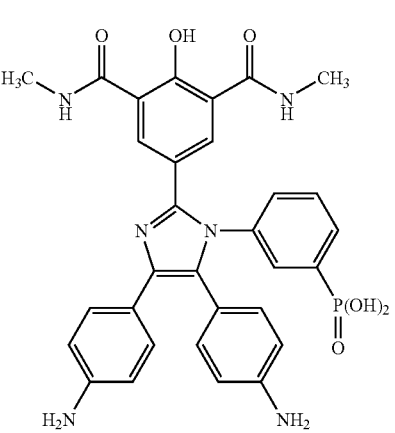
26
27
28

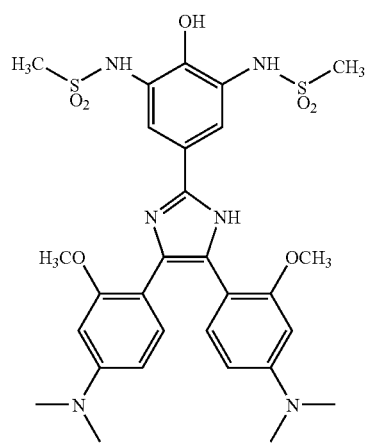
29
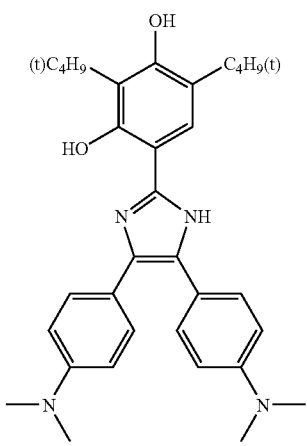
32
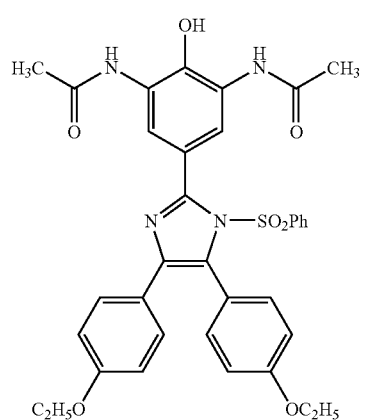
30
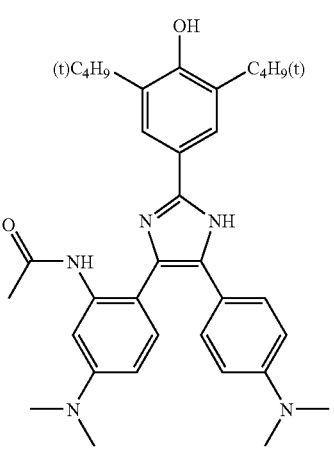
33
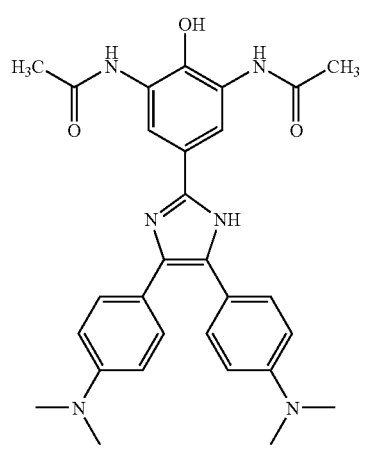
31
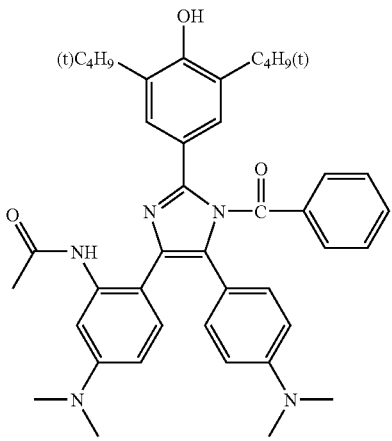
34

29
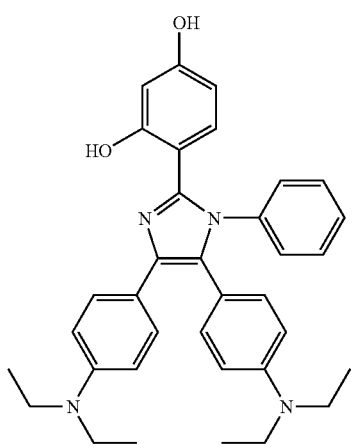
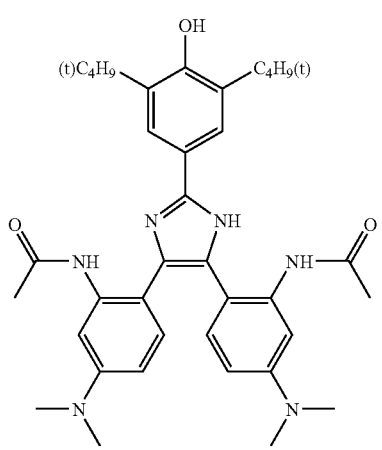
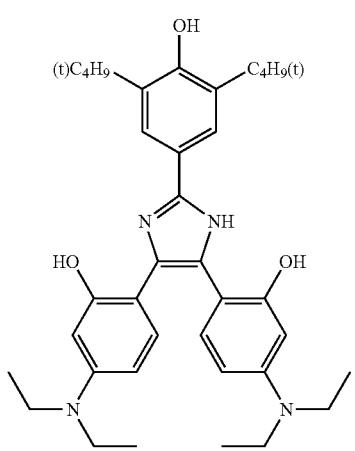
30
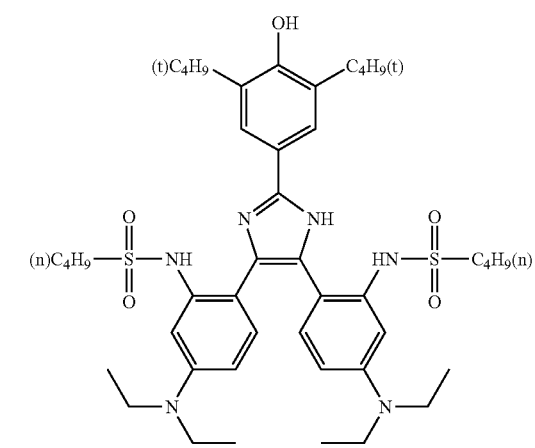
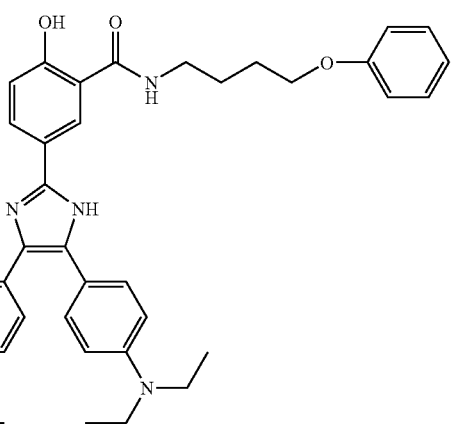
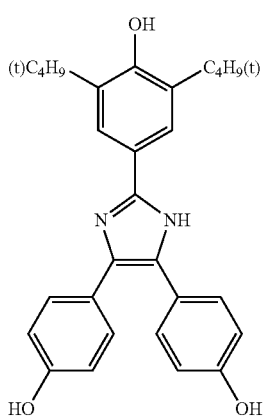

31
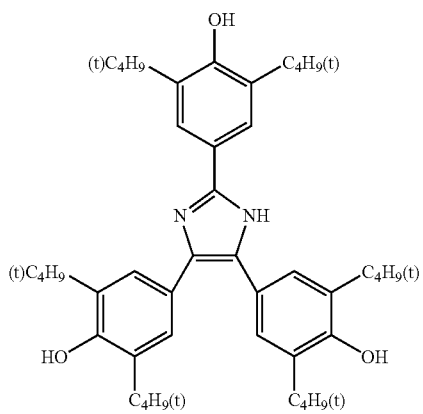
42
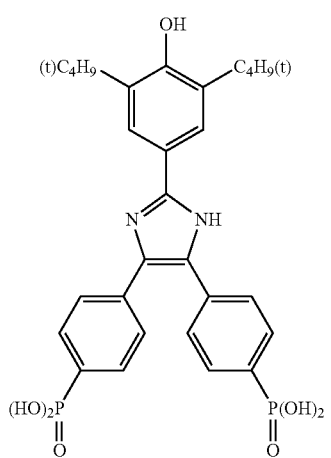
43
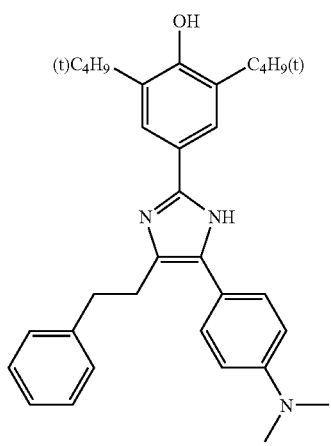
32
41
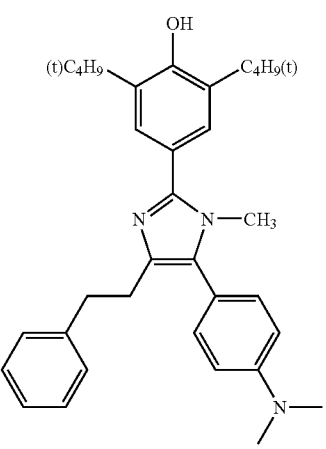
44
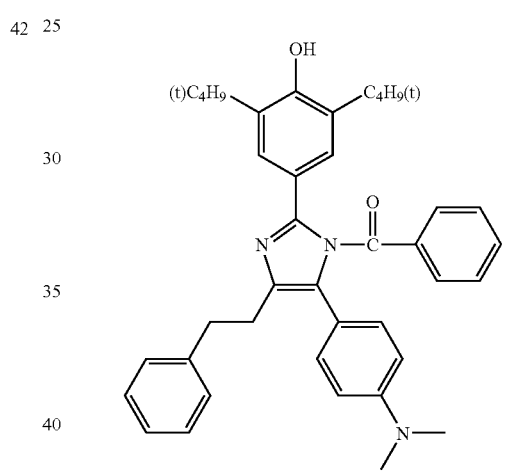
45
46
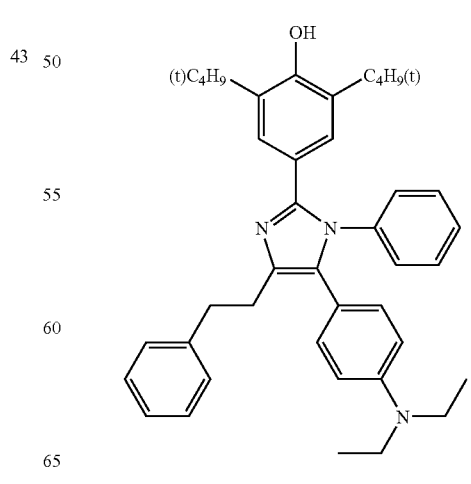

47
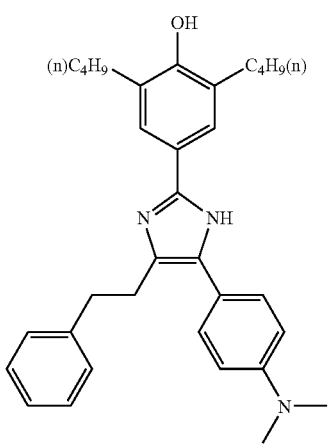
48
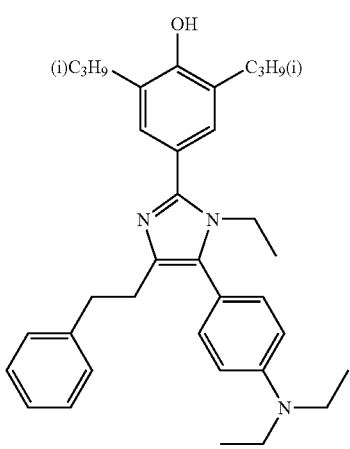
49
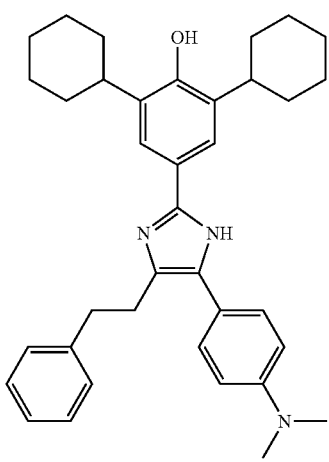
50
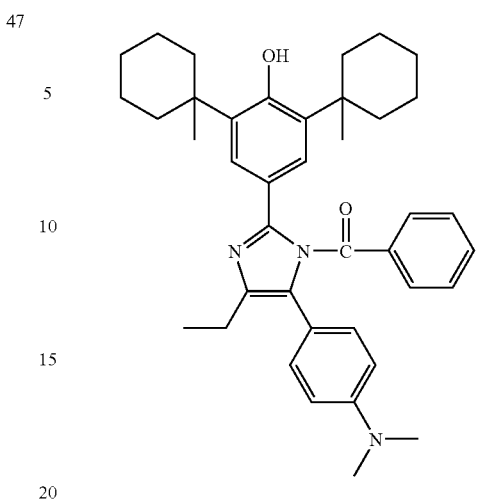
51
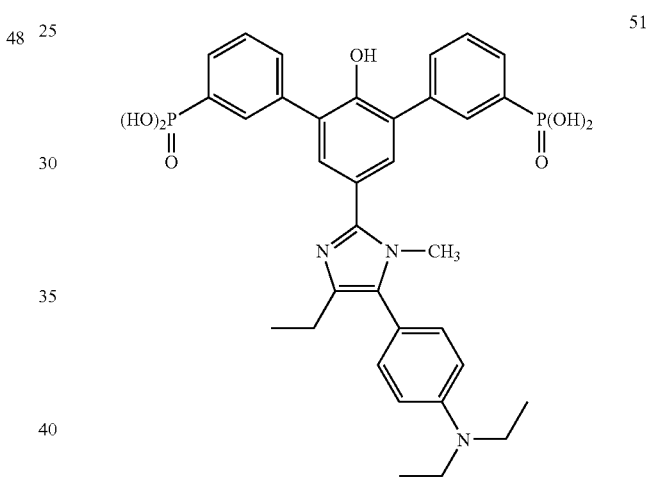
52
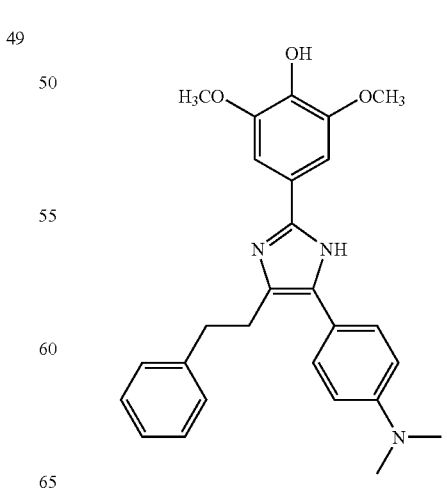

-continued
53
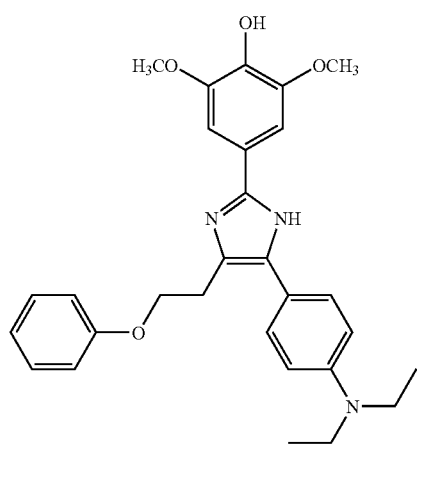
54
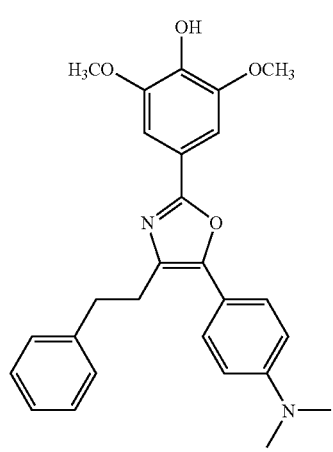
55
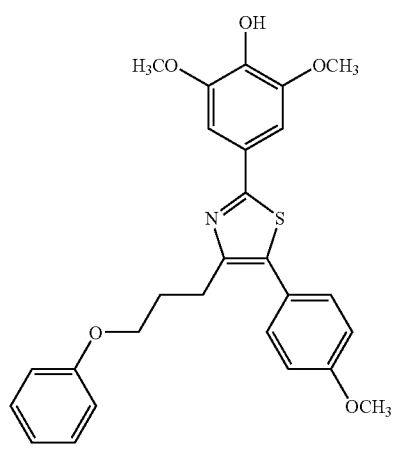
-continued
56
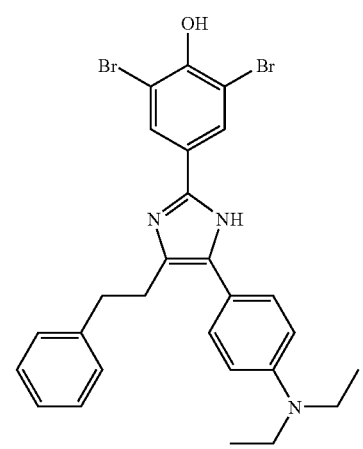
57
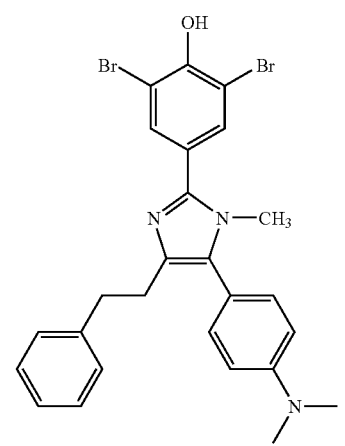
58
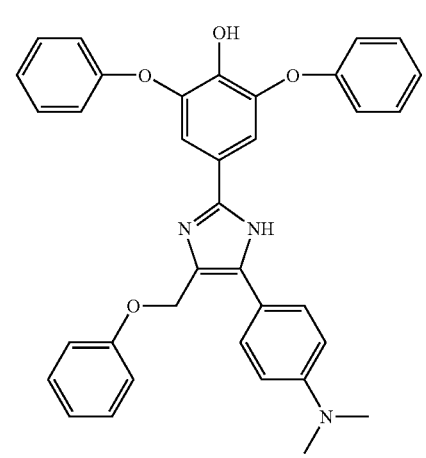

59
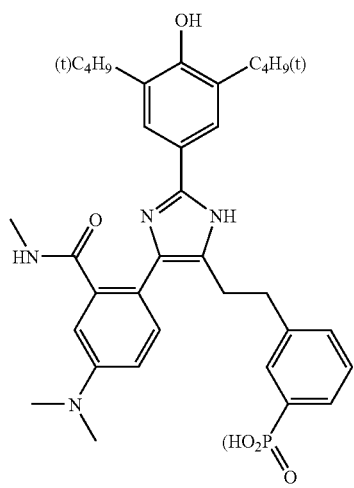
60
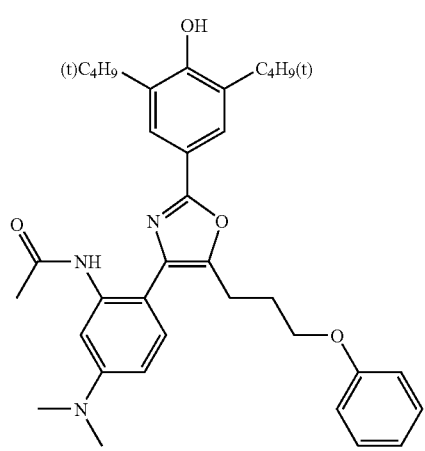
61
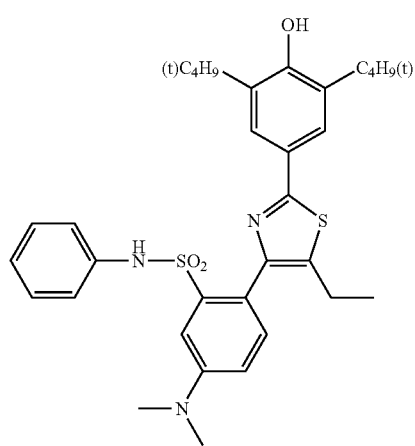
62
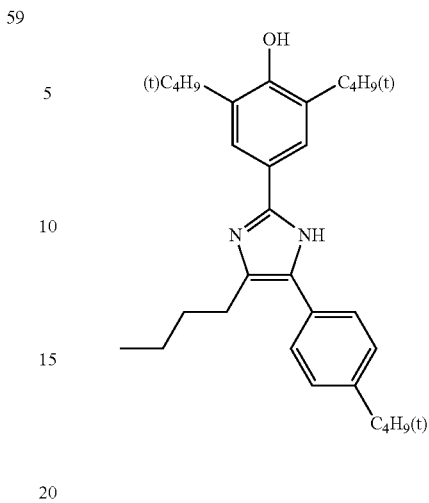
63
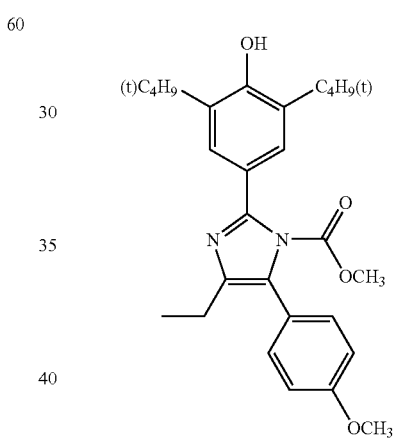
64
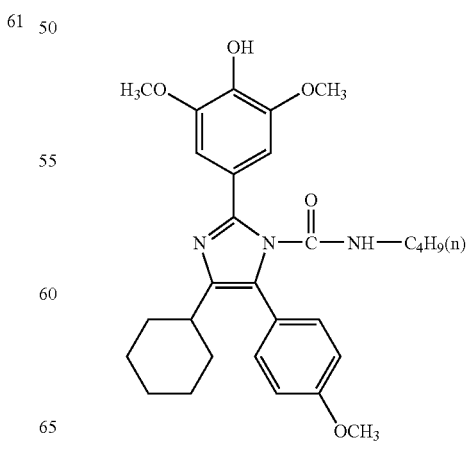

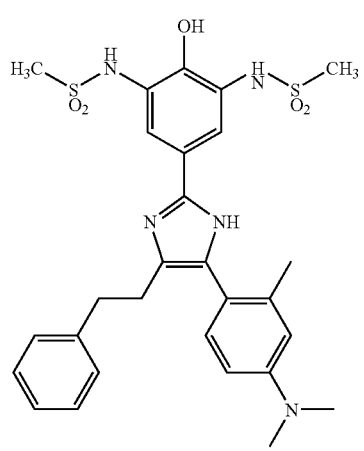
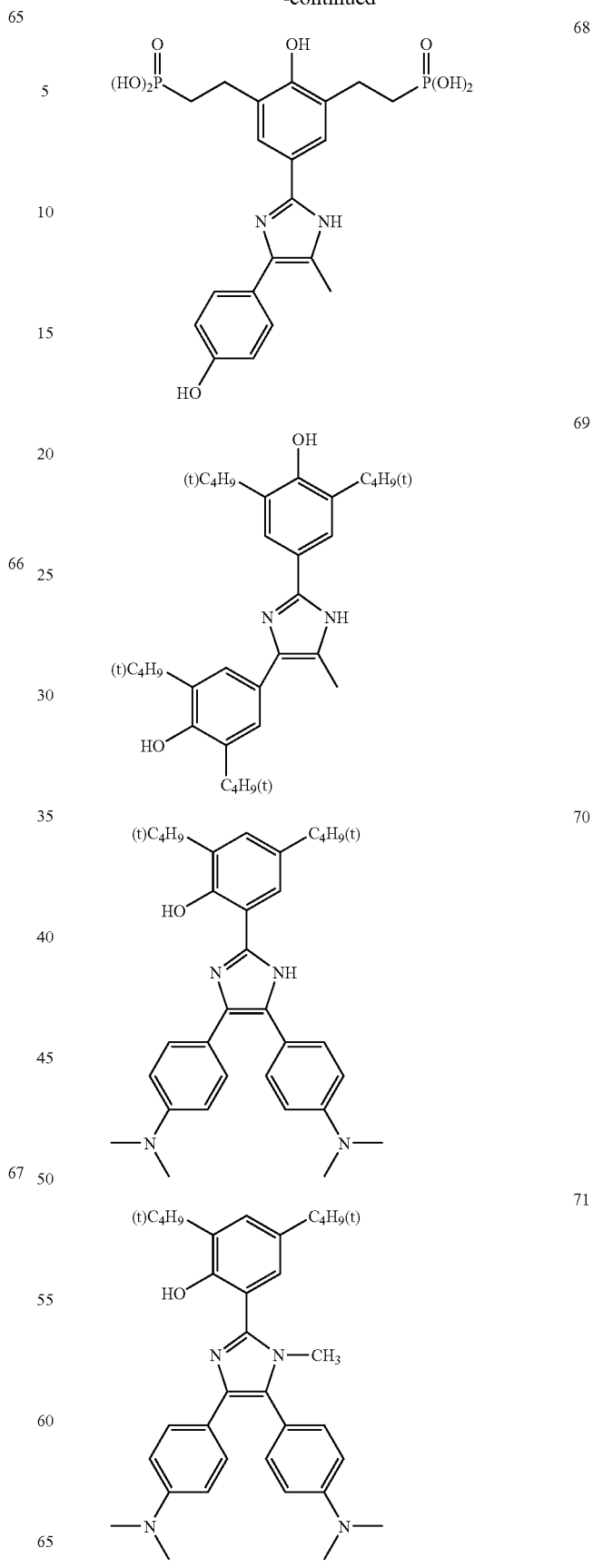

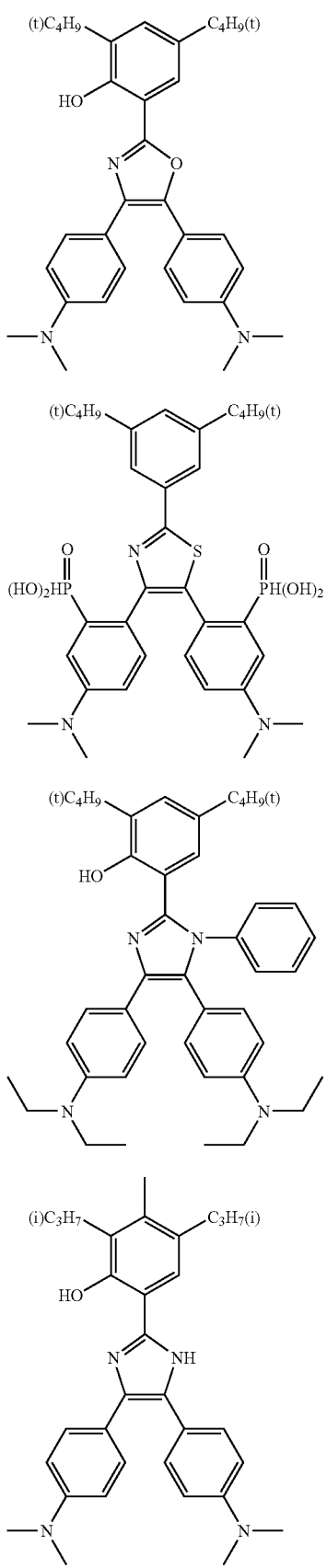
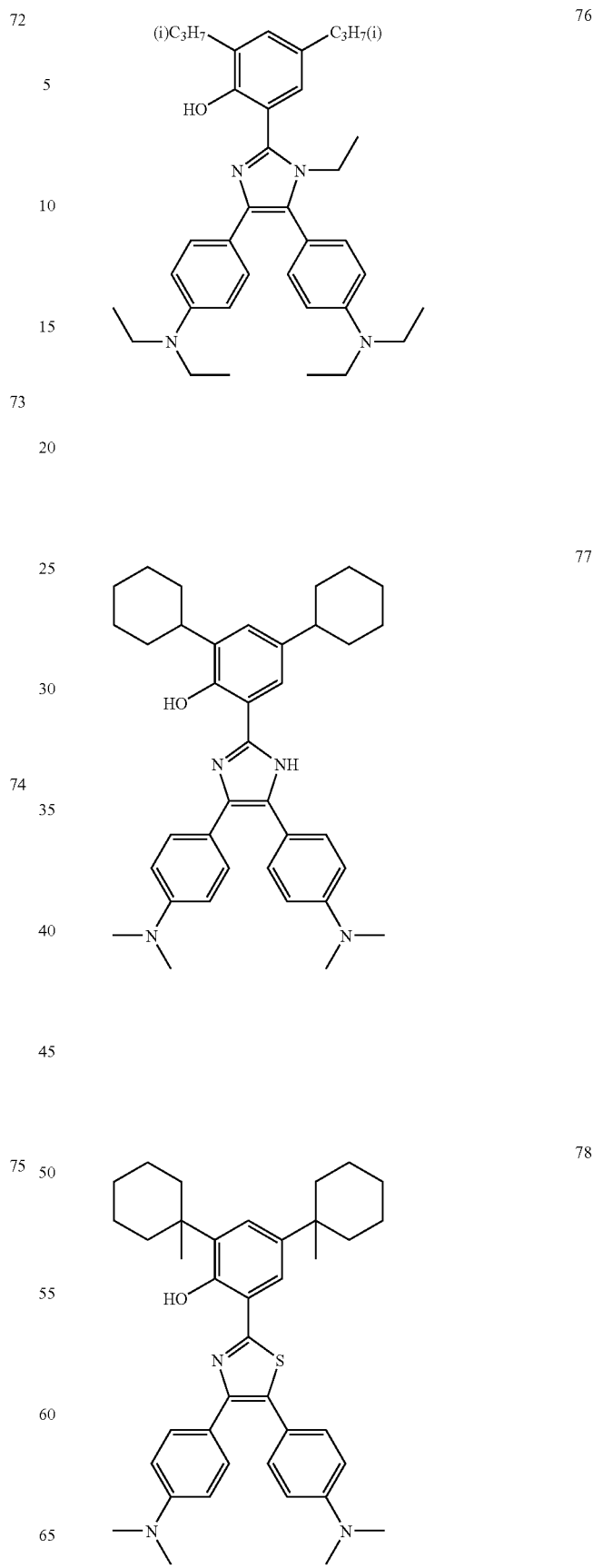

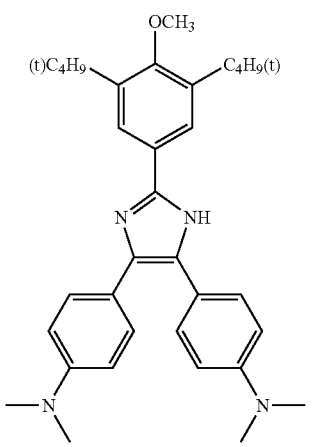
79
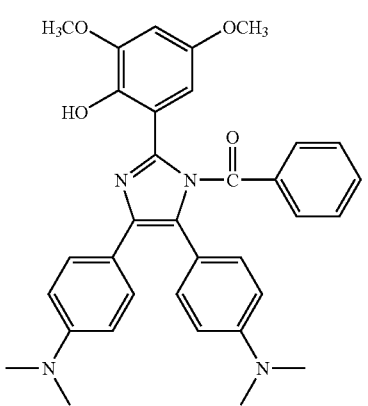
80
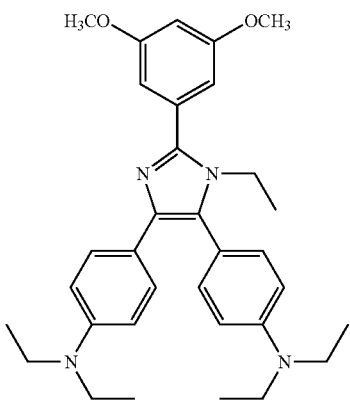
81
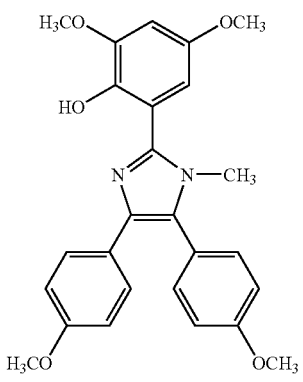
82
83
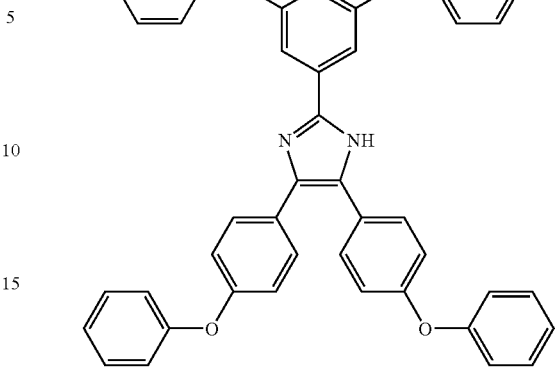
84
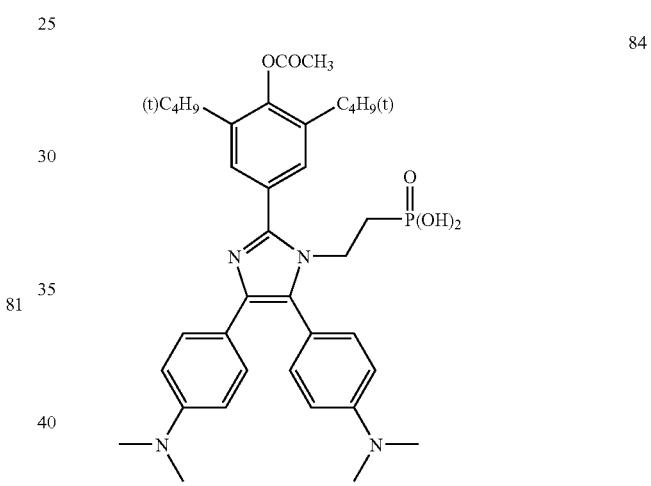
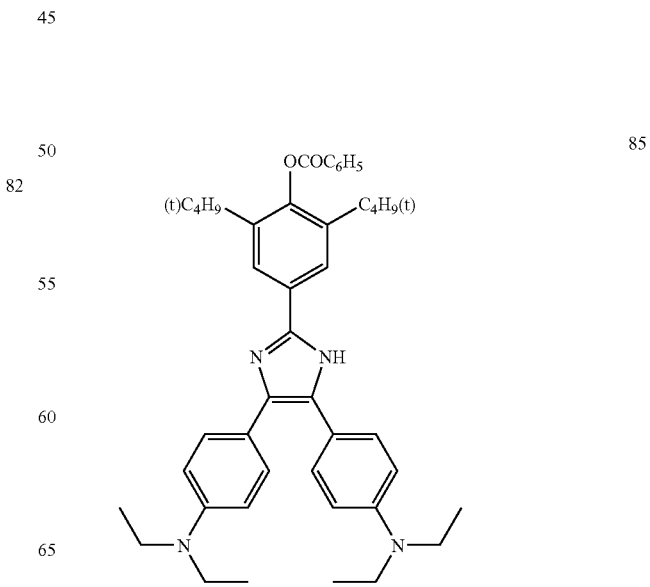
85

86
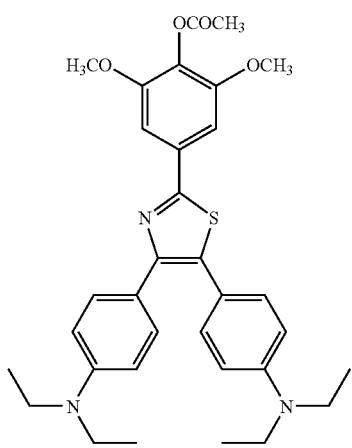
87
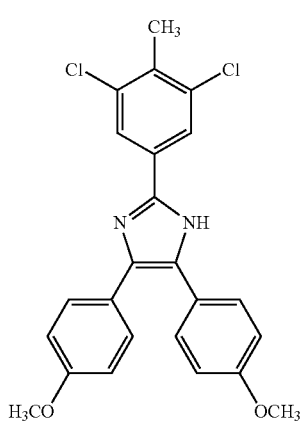
88
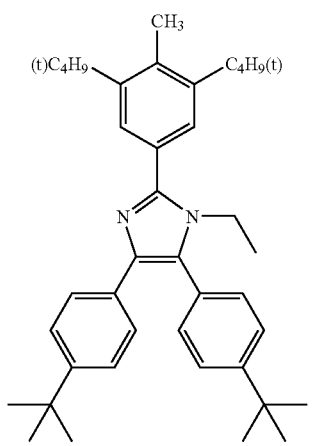
89
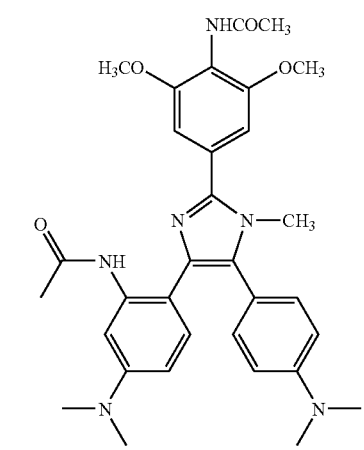
90
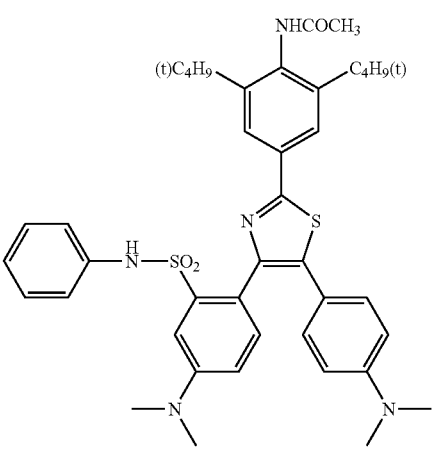
91
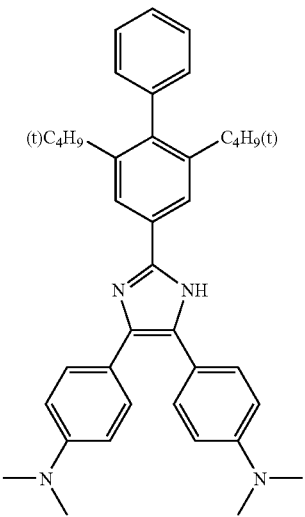

47
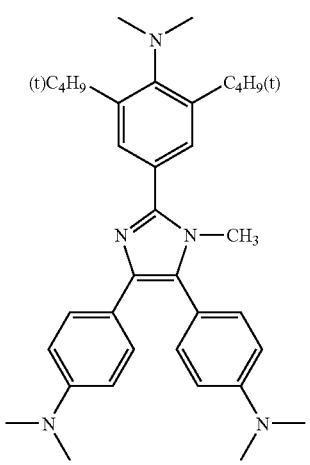
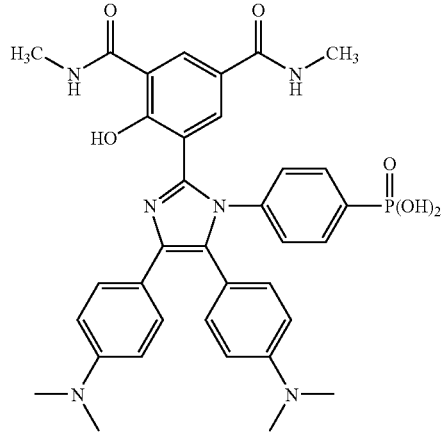
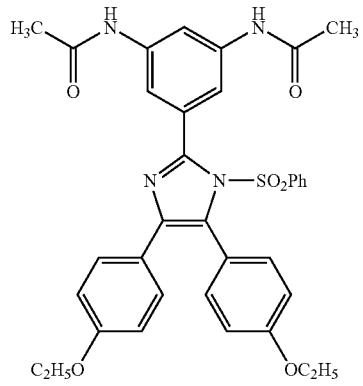
48
92
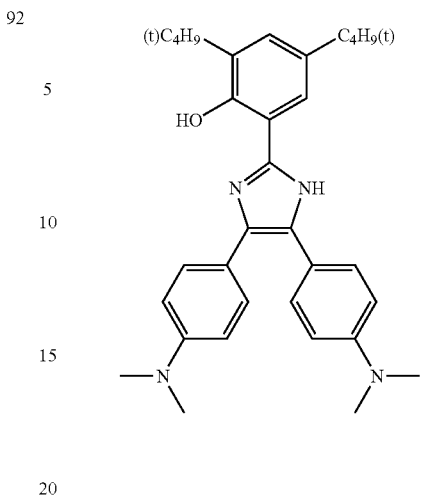
93
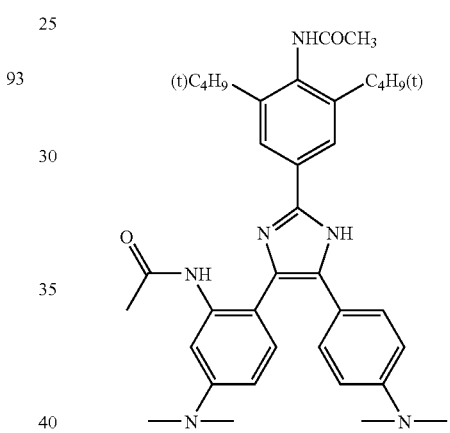
94
95
96
97
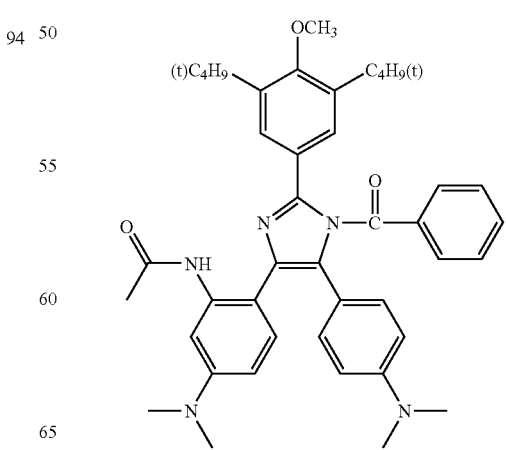

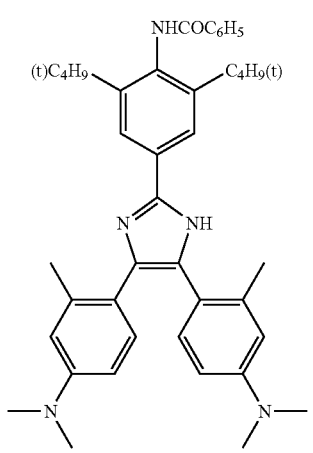
98
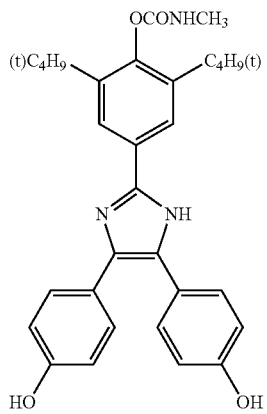
102
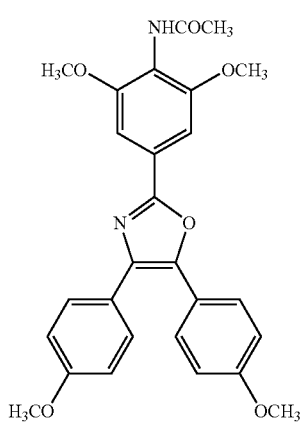
99
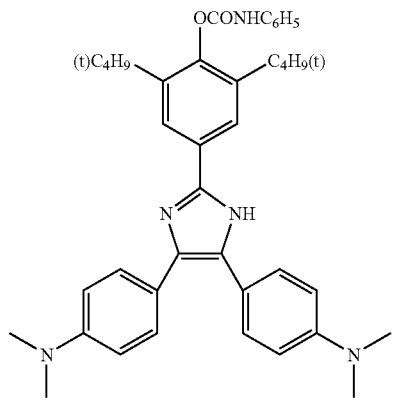
103
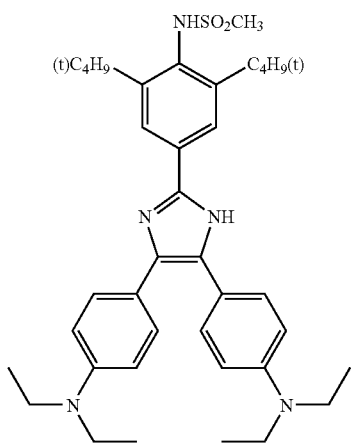
100
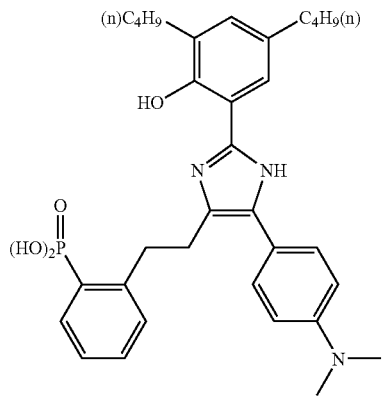
104
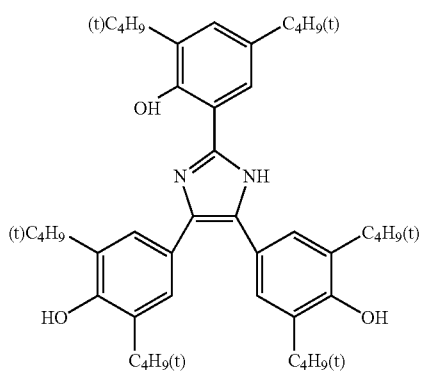
101
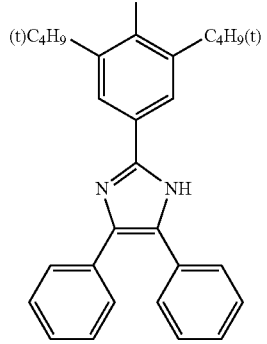
105

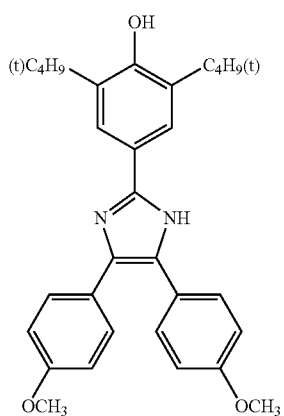
106
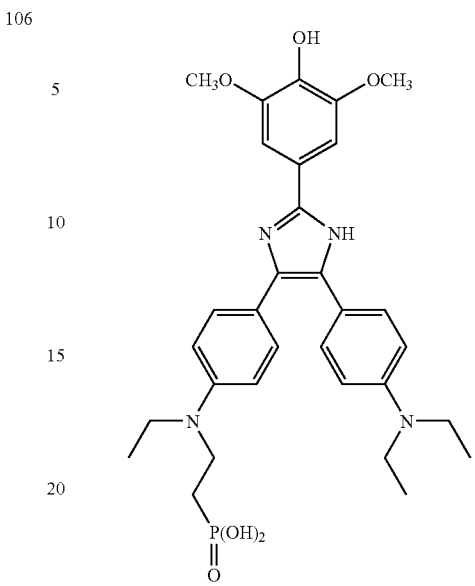
109
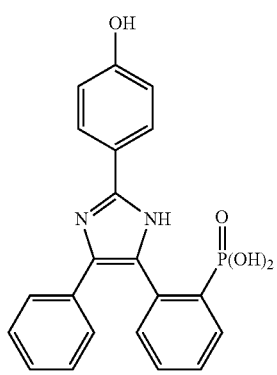
107
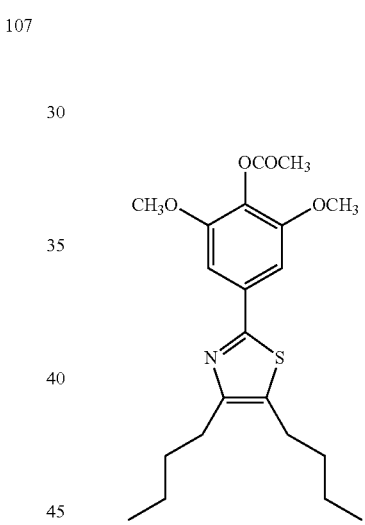
110
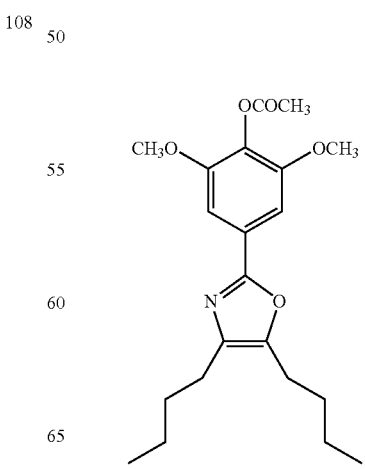
111

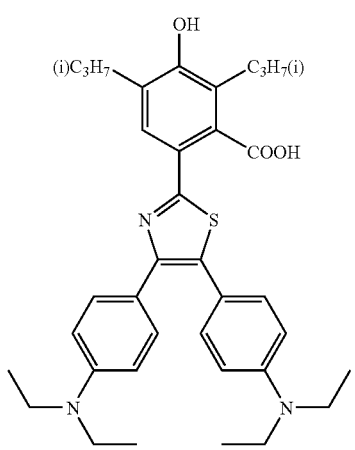

112

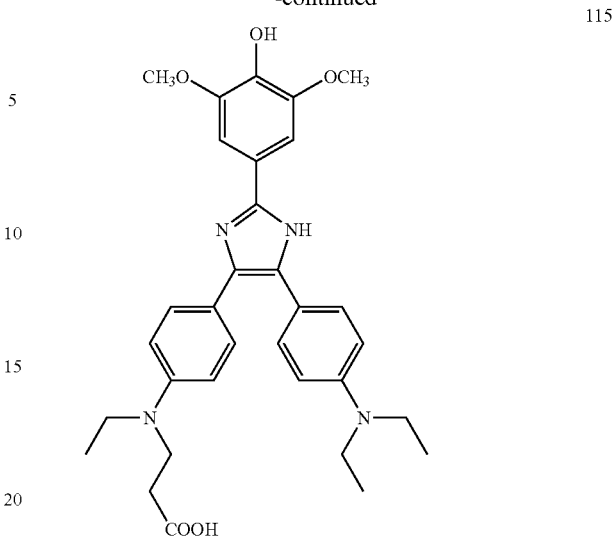

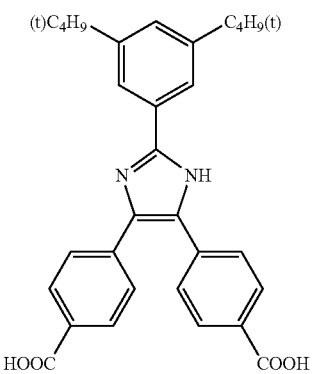

113

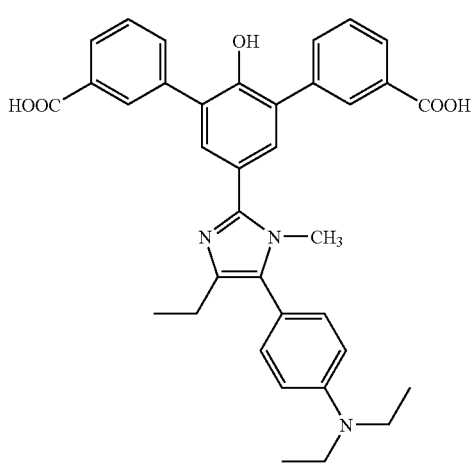

114

115

[Constitution of Electrochemical Display Element]

In the display of the present invention, various constituting layers other than the above-described constituents can be provided according to necessity. For example, a constitution of element which can display color display by forming a layer containing a compound having electrochromic property on opposed electrodes may be provided.

In the electrochemical display element of the present invention, a pair of electrodes facing to each other is provided at the displaying portion. A transparent electrode such as ITO electrode is provided onto an electrode 1 which is one of the opposite electrodes near the display portion (electrode of displaying portion), and a metal electrode such as silver electrode is provided onto another electrode 2 (electrode of non-display portion). An electrolyte containing silver or the compound containing silver in the chemical structure thereof is held between the electrode 1 and the electrode 2. Redox reaction of silver is caused on the electrodes 1 and 2 by applying both polars, negative and positive, voltage between the opposite electrodes so that a black silver image in a reduced state and a transparent of silver in a oxidized state can be reversibly changed.

(Electronic Insulation Layer)

In the display of the present invention, an electronic insulation layer can be provided.

The electronic insulation layer applicable to the present invention may be a layer having both of ion insulation ability and electronic insulation ability. For instance, a solid electrolyte layer formed by filming a polymer having polarity or a salt thereof, a suspected solid layer constituted by a porous layer having high electronic insulation ability which carries an electrolyte in the pores thereof, a porous polymer layer having pores and a porous inorganic material having relatively low dielectric constant such as a silicon-containing compound are cited.

As the method for forming the porous layer, the known methods such as the followings can be applied; a sintering (fusion bonding) method in which polymer fine particles or inorganic particles are added to a binder so as to be partially bonded with together and pores formed between the particles are utilized, an extraction method in which a layer constituted by an organic or inorganic substance soluble in a solvent and a binder insoluble in the solvent is formed and then the organic or inorganic substance is dissolved by the solvent so as to form fine pores, a foaming method in which a polymer is heated or degassed to form foams, a phase conversion method in which a polymer is subjected to phase separation by operating a good solvent and a poor solvent and a radiation irradiating method in which one or more radiations are irradiated for forming fine pores. In concrete, the electronic insulation layers described in JP-A H10-30181, JP-A 2003-107626, JP-B H7-95403 and U.S. Pat. Nos. 2,635,715, 2,849,523, 2,987,474, 3,066,426, 3,464,513, 3,483,644, 3,535,942 and 3,062,203 can be cited.

(Another Additive)

As the constituting layer of the display of the present invention, auxiliary layers such as a protection layer, filter layer, antihalation layer, crossover light cutting layer and backing layer are cited. In such the auxiliary layers, various chemical sensitizers, noble metal sensitizers, optical sensitizing dyes, super sensitizers, couplers, high-boiling solvents, antifoggants, stabilizers, development inhibitors, bleach accelerators, fixing accelerators, color mixing preventing agents, formalin scavengers, tone controlling agents, hardeners, surfactants, thickeners, plasticizers, lubricants, UV absorbents, irradiation preventing agent, light absorbing filter dyes, anti-mold agent, polymer latexes, heavy metals, antistatic agent and matting agent can be contained according to necessity.

The above additives are described in detail in Research Disclosure, hereinafter referred to as RD, vol. 176, Item/17643 (December 1978), vol. 184, Item/18431 (August 1979), vol. 187, Item/18716 (November 1979), and vol. 308, Item/308119 (December 1989).

The kinds of compounds and the description position thereof in the above there Research Disclosures are shown below.

|  | RD17643 | | RD18716 | RD308119 | |
|---|---|---|---|---|---|
| Additive | Page | Class | Page | Page | Class |
| Chemical sensitizer | 23 | III | 648UR | 96 | III |
| Sensitizing dye | 23 | IV | 648-649 | 996-8 | IV |
| Desensitizing dye | 23 | IV | | 998 | IV |
| Dye | 25-26 | VIII | 649-650 | 1003 | VIII |
| Developing accelerator | 29 | XXI | 648UR | | |
| Antifoggant/Stabilizer | 24 | IV | 649UR | 1006-7 | VI |
| Whitening agent | 24 | V | | 998 | V |
| Hardener | 26 | X | 651L | 1004-5 | X |
| Surfactant | 26-27 | XI | 650R | 1005-6 | XI |
| Antistatic agent | 27 | XII | 650R | 1006-7 | XIII |
| Plasticizer | 27 | XII | 650R | 1006 | XII |
| Lubricant | 27 | XII | | | |
| Matting agent | 28 | XVI | 650R | 1008-9 | XVI |
| Binder | 26 | XXII | | 1003-4 | IX |
| Support | 28 | XVII | | 1009 | XVII |

In the above, UR, R and L is each upper right, right and left, respectively.

(Substrate)

As the substrate in the present invention, film made of a synthesized plastic such as polyolefins such as polyethylene and polypropylene, polycarbonates, cellulose acetate, poly (ethylene terephthalate), poly(ethylene dinaphthalene dicarboxylate), poly(ethylene naphthalate), poly(vinyl chloride), polyimide. polyvinylacetals and polystyrenes are preferably usable, for example. Polystyrenes having syndiotactic structure are also preferably usable. These substrates can be obtained by the methods described in JP-A S62-117708, JP-A H1-46912 and 1-178505. Moreover, a metallic substrate such as stainless steel, a paper substrate such as baryta paper and resin-coat paper and a support formed by providing a reflective layer on the above plastic film and the support described in JP-A S62-253195, pp. 29-31, are cited as the support. Ones described in RD No. 17643, p. 28, No. 18716, right column of p. 647 to left column of p. 648, and No. 307105, p. 879 are also preferably usable. The supports which are thermally treated at a temperature lower than the Tg such as that described in U.S. Pat. No. 4,141,735 for inhibiting the curling caused by winding can be used. These supports may be subjected to a surface treatment for improving the adhesion with another constituting layer. A treatment by glow discharge, UV irradiation, corona or flame can be used in the present invention. Furthermore, the supports described in Kouchi Gijutu (known technology) No. 5, Mar. 22, 1991, pp. 44-149, Aztec Corp., are also usable. Moreover, supports described in RD No. 308119, p. 1009, Product License Index, 92, p. 108, item of Support are cited. Other than the above, a glass support and epoxy resin in which glass is kneaded are usable.

(Electrode)

In the electrochemical display element of the present invention, at least one of the opposite electrodes is preferably a metallic electrode. For the metallic electrode, known metal species such as platinum, gold, silver, copper, aluminum, zinc, nickel, titanium, bismuth, and their alloys are usable. Metal electrode relating to the present invention may have a constitution comprising a plurality of layers of 2 or more. The upper most surface layer of the metallic electrode is preferably formed by the metal having lower ionization tendency than metal contained in polymer layer, from the viewpoint of durability of the electrode.

The electrode is produced by a known method such as a an electrolytic plating method, a nonelectrolytic plating method, a displacement plating method, vapor deposition method, printing method, inkjet method, spin coat method and CVD method, for example.

In the electrochemical display element of the present invention, at least one of the opposite electrodes is preferably a transparent electrode. There is no limitation as to the transparent electrode as long as that is transparent and electro conductive. For example, indium tin oxide (ITO), indium zinc oxide (IZO), fluorine-doped tin oxide (PTO), indium oxide, zinc oxide, platinum, gold, silver, rhodium, copper, chromium, carbon, aluminum, silicon, amorphous silicon, bismuth silicon oxide (BOS) are cited. Such the electrode can be formed, for example, by vapor depositing an ITO layer on the substrate through a mask by a spattering method or patterning by a photolithographic method after uniformly forming an ITO layer. The surface conductivity is preferably not more than 100Ω/□ and more preferably not more than 10Ω/□. The thickness of the transparent electrode is usually from 0.1 to 20 μm though there is no limitation.

(Another Constituent of Display)

In the display element of the present invention, a sealing agent, columnar structural material and spacer particle can be used according to necessity.

The sealing agent is a material for preventing leak of the contents and is also called as a sealant, and a curable resin such a thermal curable type, photo curable type, a moisture curable type and an anaerobic curable resins, for example, an epoxy resin, a urethane type resin, an acryl type resin, a vinyl acetate type resin, an ene-thiol type resin, a silicone type resin and a modified-polymer resin are usable.

The columnar structural material gives strong self hold ability (strength) between the substrates, for example, structural materials having shape of columnar, prism, oval columnar, trapezoidal prism each arranged at a certain space to form a designated pattern such as a lattice orientation can be applied. The structural material may also be a stripe-shaped material arranged at a certain interval. It is preferable that the arrangement of the columnar materials is considered so that the space between the substrates is suitably held and the image display is not disturbed, such the arrangement includes an arrangement having the equal interval, the gradually varying interval and that in which a designated patter is repeated at a certain cycle without random arrangement. Practically suitable strength for the display can be obtained when the ratio of the area occupied by the columnar structural material is from 1 to 40% of the area of the display.

A spacer may be provided for keeping uniformity of the gap between the pair of the substrates. As the spacer, a sphere of resin or inorganic material can be exemplified. A fixing spacer having a thermoplastic resin coating layer on the surface thereof is also suitably usable. For uniformly holding the gap between the substrates, the columnar structural material may be used solely or together with the spacer or the spacer is solely used instead of the columnar structural material. The diameter of the spacer is lower than or preferably the same as the height of the columnar structural material when such the structural material is formed. When no columnar structural material is formed, the diameter of the spacer corresponds to the thickness of the cell gap.

[Process for Producing Electrochemical Element]

An example of process for producing the electrochemical display element of the present invention comprises steps below;

forming a film (hereinafter refer to as the film of the present invention) on at least one electrode in opposing electrodes by coating method, inkjet method, printing method or dispensing method from a pasting liquid containing a white scattering material and a polymeric binder;

evaporating a solvent in the pasting liquid remained in the film of the present invention;

sealing around the electrode except for an inlet by a heat curable or ultraviolet ray curable resin;

sticking the opposed electrodes;

forming an empty cell by curing while pressing;

pouring a low-viscosity electrolyte into the cell from the inlet after evacuating the air in the cell;

sealing the inlet portion by heat curable or ultraviolet ray curable resin; and dissolving the polymeric binder in electrolyte in the film of the present invention to form a gel electrolyte layer by heating whole of the cell.

Screen printing is preferred to the process for forming the film of the present invention.

Thickness of the film of the present invention is preferable thinner than the distance between the opposed electrodes of the electrochemical display element. Preferable thickness is in the range of 5 μm to 40 μm.

Shape of film of the present invention is preferably porous or patterning, from viewpoint of solubility and mixing uniformity of polymeric binder into electrolyte liquid. Porous state relating to the present invention is the states wherein electrolyte can be penetrate into the layer of the present invention.

(Cell)

Cell relating to the present invention is a constitution depositing opposed electrodes keeping desired gap between electrodes. By filling electrolyte into cell relating to the present invention, and by applying enough voltage between opposed electrodes, electrochemical reaction can be occurred on the electrode.

(Screen Printing)

In the present invention, the sealing agent, columnar structural material and electrode can be patterned by the screen printing. In the screen printing, a screen having designated patterns formed thereon is overlapped on the electrode surface of the substrate and the material to be printed (a composition for forming the columnar structure such as photo curable resin) is put on the screen and a squeezer is moved at a designated pressure, angle and speed. Thus the material to be printed is transferred on to the substrate through the patterns on the screen, and then the transferred material is thermally cured and dried. When the columnar structural material is formed by the screen printing, the resin material is not limited to the photo curable resin and a thermally curable resin such as epoxy resin and acryl resin and a thermoplastic resin are also applicable. As the thermoplastic resin, poly(vinyl chloride) resin, poly(vinylidiene chloride) resin, poly(vinyl acetate) resin, polymethacrylate resin, polyacrylate resin, polystyrene resin, polyamide resin, polyethylene resin, polypropylene resin, fluoro resin, polyurethane resin, polyacrylonitrile resin, poly(vinyl ether) resin, poly(vinyl ketone) resin, polyether resin, polyvinylpyrrolidone resin, saturated polyester resin, polycarbonate resin and poly(ether chloride) resin are cited. The resin is preferably used in a pasting state by dissolving a suitable solvent.

After the columnar structural material is formed on the substrate as above, the spacer is provided onto at least one of the substrate according to necessity and one of the pair of the substrates is placed on the other so as to be faced the electrode forming surface to prepare an empty cell. The piled pair of the substrates is pasted by heating while pressing from both sides to form a display cell. For completing the display element, the electrolyte composition is injected between the substrates by a vacuum injection method. In otherwise, it is allowed that the electrolyte composition is previously dropped on one of the substrate on the occasion of pasting so that the liquid crystal composition is enclosed together with the pasting at the same time.

(Driving Method of Electrochemical Display Element)

In the electrochemical display element of the present invention, the driving method is preferably applied, in which the deposition of blacken silver is carried out by applying a voltage higher than the deposition overpotential and the deposition is continued by applying a voltage lower than the deposition overpotential. Lowering of the writing energy and load on the driving circuit and rising the writing speed of image can be realized by such the driving operation. It is usually known that there is overvoltage in the electrode reaction in the field of electrochemistry. For instance, the overvoltage is described in detail in "Chemistry of Electron Transfer—Primer of electrochemistry" p. 121, Asakura Shoten, 1996. The display element of the present invention can be also considered as an electrode reaction between the electrode and silver in the electrolyte, therefore it can be easily understood that the overvoltage is caused with the deposition of silver. The magnitude of the overvoltage is depended on the exchanging current density, therefore it is presumed that electric energy at the surface of the blackened silver is lower and electron injection can easily carried out since the deposition of blackened silver can be continued by applying voltage lower than the deposition overpotential after the formation of blackened silver as in the present invention.

The driving operation of the electrochemical display element of the present invention may be simple matrix drive or active matrix drive. The simple matrix drive in the present invention is a driving method in which electric current is successively applied to a circuit constituted by an anode line containing plural anodes and a cathode line containing plural cathodes which are faced so that the lines are crossed at a right angle. The use of the simple matrix drive has merits that the circuit configuration and the driving IC can be simplified and the cost can be lowered. The active matrix is a method in which the driving is carried out by TFT circuits each formed at the crossing point of lattice constituted by scanning lines, data lines and electric current supplying lines. Such the method has merits of gradation and memory function since switching can be performed by every pixel, for example, the circuit described in JP-A 2004-29327, FIG. 5 can be used.

(Commercial Application)

The electrochemical display element of the present invention can be applied in the fields relating to electronic book, ID card, public, transport, broad casting, accounting and commodity distribution. In concrete, the followings are cited; a door key, student identification card, staff identification card, various member's card, convenience store card, department store card, automatic selling machine card, gasoline station card, subway or rail way card, bus card, cash card, credit card, highway card, driving license, medical consultation ticket, clinical record, health insurance certificate, residence registration ledger, passport and electronic book.

EXAMPLES

The present invention is concretely described referring examples though the present invention is not limited to the examples. "part" and "%" described in the examples are each represents "part by weight and "weight percent" respectively.

<<Preparation of Electrolyte Liquid>>

Example 1

Preparation of Electrolyte Liquid 1

Into 2.5 g of dimethyl sulfoxide (DMSO), 100 mg of silver iodide (AgI), 200 mg of sodium iodide (NaI) were added and completely dissolved by heating, and then 1.2 g of titanium dioxide CR-90 (manufactured by Ishihara Sangyo Kaisha Ltd.) was added and dispersed by ultrasonic disperser to obtain electrolyte liquid 1.

(Preparation of Electrolyte Liquid 2)

Into 2.5 g of dimethyl sulfoxide (DMSO), 100 mg of silver iodide (AgI), 200 mg of sodium iodide (NaI) and 1.0 g of polyvinylpirolidone (PVP, average molecular weight 100,000) were added and completely dissolved by heating, and then 1.2 g of titanium dioxide CR-90 (manufactured by Ishihara Sangyo Kaisha Ltd.) was added and dispersed by ball mill to obtain gel electrolyte liquid 2.

(Preparation of Electrolyte Liquid 3)

Into 2.5 g of γ-butyrolactone, 100 mg of silver p-toluenesulfonate, 200 mg of 3-mercapto-1,2,4-triazole (MTZ) were added and completely dissolved by heating to obtain electrolyte liquid 3 in the form of liquid.

(Preparation of Electrolyte Liquid 4)

Into 2.5 g of γ-butyrolactone, 100 mg of silver p-toluenesulfonate, 200 mg of 3-mercapto-1,2,4-triazole (MTZ) and butyral resin #3000-1 (average degree of polymerization of 600, ratio of PVA 18%) (product of Denki kagaku kogyou kabushiki kaisha) were added and completely dissolved by heating to obtain electrolyte liquid 4 in the form of liquid.

(Preparation of Electrolyte Liquid 5)

Into 2.5 g of dimethyl sulfoxide (DMSO), 100 mg of silver iodide (AgI), 200 mg of sodium iodide (NaI) were added and completely dissolved by heating to obtain electrolyte liquid 5 in the form of liquid.

<<Preparation of Pasting Liquid>>

(Preparation of Pasting Liquid 1)

Into solvent mixture of 0.5 g of xylene and 0.5 g of isopropanol, 0.4 g of butyral resin #3000-K (average degree of polymerization of 800, ratio of PVA 12%) (product of Denki kagaku kogyou kabushiki kaisha) were added and completely dissolved by heating, and 0.5 g of titanium dioxide CR-90 (manufactured by Ishihara Sangyo Kaisha Ltd.) was added and dispersed by ball mill to obtain pasting liquid 1.

(Preparation of Pasting Liquid 2)

Into solvent mixture of 0.5 g of xylene and 0.5 g of isopropanol, 0.4 g of butyral resin #3000-1 (average degree of polymerization of 600, ratio of PVA 180) (product of Denki kagaku kogyou kabushiki kaisha) were added and completely dissolved by heating, and 0.5 g of titanium dioxide CR-90 was added and dispersed by ball mill to obtain pasting liquid 2.

(Preparation of Pasting Liquid 3)

Into solvent mixture of 0.5 g of xylene and 0.5 g of isopropanol, 0.4 g of butyral resin #4000-2 (average degree of polymerization of 1000, ratio of PVA 190) (product of Denki kagaku kogyou kabushiki kaisha) were added and completely dissolved by heating, and 0.5 g of titanium dioxide CR-90 was added and dispersed by ball mill to obtain pasting liquid 3.

<<Preparation of Electrode>>

(Preparation of Electrode 1)

An ITO layer having a pitch of 145 μm and a width of 130 μm was formed on a glass substrate of 10 cm×10 cm with a thickness of 1.5 mm by known method to obtain a transparent electrode (Electrode 1).

(Preparation of Electrode 2)

A silver-palladium electrode having a thickness of 0.8 μm, a pitch of 145 μm and an electrode interval of 130 μm was formed on a glass substrate of 10 cm×10 cm with a thickness of 1.5 mm by known method to obtain Electrode 2.

<<Preparation of Reference Display Element>>

(Preparation of Display Element 1)

On the surrounding part of Electrode 1 and Electrode 2, an olefin sealant containing beads spacer made of glass with average particle diameter of 40 μm and 10% by volume fraction were coated, and Electrode 1 and Electrode 2 were glued together and pressed with heat to form empty cells. Electrolyte liquid 1 was vacuum injected into the empty cell and an inlet was sealed by an epoxy type ultra-violet curable resin to prepare Display Element 1.

(Preparation of Display Element 2)

Display element 2 was prepared in the same manner in Display Element 1 except that Electrolyte Liquid 1 was replaced by Electrolyte Liquid 2.

<<Preparation of Display Element of the Present Invention>>

(Preparation of Display Element 3)

The above prepared Electrolyte Liquid 1 was printed on electrode 2 by a screen printing method to form an electrolyte film having average thickness of 30 μm after drying. Solvent were evaporated by drying 30 minutes at 60° C., and film containing titanium dioxide and polymer binder of butyral was formed by further drying 1 hour in the circumstance of 85° C. to obtain Electrode 3. Uniform film on whole surface of above Electrode 3 was observed by optical microscope as shown in FIG. 1.

On the surrounding part of Electrode 3 and Electrode 1, an olefin sealant containing beads spacer made of glass with average particle diameter of 40 μm and 10% by volume fraction were coated, and Electrode 3 and Electrode 1 were glued together and pressed with heat to form empty cells. Electrolyte liquid 3 was vacuum injected into the empty cell. An inlet was sealed by an epoxy type ultra-violet curable resin and a butyral resin #3000-K was completely dissolved by heating whole of cells at 80° C. to prepare Display Element 3.

After evaluations of Display Element described below, cell was took to pieces and Electrolyte in a gel state was observed.

(Preparation of Display Element 4)

Bubbles were completely filled in Pasting liquid 1 by bubbling nitrogen gas with stirring. Then, Electrolyte Liquid 1 was printed on electrode 2 by a screen printing method to form an electrolyte film having average thickness of 40 μm after drying. Solvent were evaporated by drying 30 minutes at 60° C., and film containing titanium dioxide and polymer binder of butyral was formed by further drying 1 hour in the circumstance of 85° C. to obtain Electrode 4. Porous film on the surface of above Electrode 4 was observed by optical microscope as shown in FIG. 2.

On the surrounding part of Electrode 4 and Electrode 1, an olefin sealant containing beads spacer made of glass with average particle diameter of 40 μm and 10% by volume fraction were coated, and Electrode 4 and Electrode 1 were glued together and pressed with heat to form empty cells. Electrolyte liquid 3 was vacuum injected into the empty cell. An inlet was sealed by an epoxy type ultra-violet curable resin and a butyral resin #3000-K was completely dissolved by heating whole of cells at 80° C. to prepare Display Element 4.

After evaluations of Display Element described below, cell was took to pieces and Electrolyte in a gel state was observed.

(Preparation of Display Element 5)

Pasting Liquid 1 was printed on electrode 2 by a screen printing method to form a grid patterned electrolyte film with 100 μm square and distance between grid being 30 μm and further having average thickness of 35 μm after drying. Solvent were evaporated by drying 30 minutes at 60° C., and film containing titanium dioxide and polymer binder of butyral was formed by further drying 1 hour in the circumstance of 85° C. to obtain Electrode 5. Patterned film on the surface of above Electrode 5 was observed by optical microscope as shown in FIGS. 3 and 4a.

On the surrounding part of Electrode 5 and Electrode 1, an olefin sealant containing beads spacer made of glass with average particle diameter of 40 μm and 10% by volume fraction were coated, and Electrode 5 and Electrode 1 were glued together and pressed with heat to form empty cells. Electrolyte liquid 3 was vacuum injected into the empty cell. An inlet was sealed by an epoxy type ultra-violet curable resin and a butyral resin #3000-K was completely dissolved by heating whole of cells at 80° C. to prepare Display Element 5.

After evaluations of Display Element described below, cell was took to pieces and Electrolyte in a gel state was observed.

(Preparation of Display Elements 6 and 7)

Display elements 6 and 7 were prepared in the same manner in Display Element 5 except that Electrolyte Liquid 1 was replaced by Electrolyte Liquids 2 or 3.

(Preparation of Display Element 8)

Display element 8 as shown in FIG. 6a was prepared in the same manner in Display Element 6 except that screen printing was replaced by dispenser printing. Jetting condition was adjusted so as to keep diameters of circles being 100 μm and distances between neighboring circles being 120 μm.

(Preparation of Display Element 9)

Display element 9 as shown in FIG. 6b was prepared in the same manner in Display Element 8 except that screen printing was replaced by inkjet printing.

(Preparation of Display Element 10)

Display element 10 was prepared in the same manner in Display Element 6 except that Electrolyte liquid 3 was replaced by Electrolyte liquid 4.

(Preparation of Display Element 11)

Display element 11 was prepared in the same manner in Display Element 6 except that Electrolyte liquid 3 was replaced by Electrolyte liquid 5.

<<Evaluation of Display Element>>

(Evaluation of Unevenness of Filling)

Unevenness of filling was rated on a scale of one to ten by visual evaluation of each of display elements prepared above. Bad state of unevenness of filling represented by 1 and good state represented by 10. Rate 6 or more can be applicable.

(Evaluation of Stability of Repeat Displaying)

A gray image was displayed on the above prepared display elements by applying 1.5 volt for 1.5 seconds and then applying −1.5 V for 0.5 seconds. The reflectance at 550 nm of the gray image was measured at optional five points by the spectral colorimeter CM-3700d, manufactured by Konica Minolta Sensing Corp. An average reflectance at 550 nm was referred to as $R_{Gray}(0)$ (a). After repeating display of 10000 times under the same voltage applying condition, an average of the reflectance at 550 nm under the same measuring condition was calculated and referred to as $R_{Gray}(10000)$ (t). The difference between $R_{Gray}(0)$ and $R_{Gray}(10000)$ was referred to as $\Delta R_{Gray}$ and $\Delta R_{Gray}$ was defined as an indicator of the stability of repeat displaying. Lower $\Delta R_{Gray}$ value corresponds to higher stability of repeat displaying.

The above obtained results are listed in Table 1.

TABLE 1

| | | Electrolyte liquid | | | | | Film containing white scattering material and polymeric binder | | | | | |
|---|---|---|---|---|---|---|---|---|---|---|---|---|
| ** | No. | Compound containing silver | Solvent 1 | Additive 1 | Titanium dioxide | Polymeric binder | No. of Pasting liquid | Titanium dioxide | Polymeric binder | Dry film thickness | Shape of Film | Film forming Process |
| 1 | 1 | AgI | DMSO | NaI | CR-90 | — | | — | — | — | — | — |
| 2 | 2 | AgI | DMSO | NaI | CR-90 | PVP | | — | — | — | — | — |
| 3 | 3 | Silver tocylate | γBL | MTZ | — | — | 1 | CR-90 | #3000-K | 30 μm | FIG. 1 | Screen printing |
| 4 | 3 | Silver tocylate | γBL | MTZ | — | — | 1 | CR-90 | #3000-K | 40 μm | FIG. 2 | Screen printing |
| 5 | 3 | Silver tocylate | γBL | MTZ | — | — | 1 | CR-90 | #3000-K | 35 μm | FIG. 3 | Screen printing |
| 6 | 3 | Silver tocylate | γBL | MTZ | — | — | 2 | CR-90 | #3000-1 | 35 μm | FIG. 3 | Screen printing |
| 7 | 3 | Silver tocylate | γBL | MTZ | — | — | 3 | CR-90 | #4000-2 | 35 μm | FIG. 3 | Screen printing |

TABLE 1-continued

| ** | | | | | | | | | | | | |
|---|---|---|---|---|---|---|---|---|---|---|---|---|
| 8 | 3 | Silver tocylate | γBL | MTZ | — | — | 2 | CR-90 | #3000-1 | 35 μm | FIG. 3 | Dispenser |
| 9 | 3 | Silver tocylate | γBL | MTZ | — | — | 2 | CR-90 | #3000-1 | 35 μm | FIG. 3 | Inkjet |
| 10 | 4 | Silver tocylate | γBL | MTZ | — | #3000-1 | 2 | CR-90 | #3000-1 | 35 μm | FIG. 3 | Screen printing |
| 11 | 5 | AgI | DMSO | NaI | — | — | 2 | CR-90 | #3000-1 | 35 μm | FIG. 3 | Screen printing |

| No. of Display Element | Evaluation results | | Re-marks |
|---|---|---|---|
| | Unevenness of filling | Stability of repeat displaying | |
| 1 | 6 | 20% | Comparative example |
| 2 | Fail to evaluate by un-filled portion | | Comparative example |
| 3 | 7 | 9% | Present invention |
| 4 | 9 | 6% | Present invention |
| 5 | 9 | 6% | Present invention |
| 6 | 10 | 3% | Present invention |
| 7 | 9 | 6% | Present invention |
| 8 | 9 | 4% | Present invention |
| 9 | 9 | 4% | Present invention |
| 10 | 10 | 3% | Present invention |
| 11 | 10 | 3% | Present invention |

** No. of Display Element,
Silver tocylate = p-toluenesulfonate,
NaI: Sodium iodide
MTZ: Mercapto triazole It is understood that the display elements prepared by the process of the present invention exhibit to fill electrolyte liquid easily, lower unevenness of filling and higher stability of repeat displaying. Especially it is understood that the electrolyte using carboxylic acid ester compound and compound (1) or (2) exhibits higher improved effect on the unevenness of filling and stability of repeat displaying.

Example 2

Preparation of Electrolyte Liquid 6

Into 2.5 g of γ-butyrolactone (γBL), 10 mg of pherocene, 50 mg of compound A below, 100 mg of silver p-toluenesulfonate, and 50 mg of tetrabutylammonium perchlorate were added and completely dissolved by heating to obtain electrolytic liquid 6 in the form of liquid.

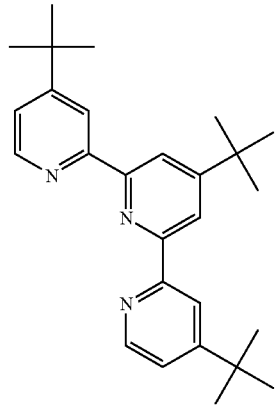

Compound A (Preparation of Electrolyte Liquid 7)
Into 2.5 g of dimethyl sulfoxide (DMSO), 100 mg of silver iodide, 200 mg of sodium iodide and exemplified electrochromic compound 13 were added and completely dissolved by heating to obtain electrolytic liquid 7 in the form of liquid.

(Preparation of Display Elements 12 and 13)
Display elements 12 and were prepared in the same manner in Display Element 6 in EXAMPLE 1 except that Electrolyte Liquid 3 was replaced by Electrolyte Liquid 6 or 7.
<<Evaluation of Display Element>>
The unevenness of filling and stability of repeat displaying were evaluated in the same manner in EXAMPLE 1. It is understood that the unevenness of filling and stability of repeat displaying were highly improved.

Display Element 12 shows black color by applying −1.5 volt for 1 second between opposed electrodes, and red color by applying +1.5 volt for 1 second. Display Element 13 shows black color by applying −1.5 volt for 1 second between opposed electrodes, and cyan color by applying +1.5 volt for 1 second. Thus it is understood that the display elements 12 and 13 can exhibit multi color display by three colors by using one electrolyte between opposed electrodes.

What is claimed is:

1. A process for producing an electrochemical display element comprising steps of:
   forming a film containing a white scattering material and a polymeric binder on at least one electrode in opposing electrodes,
   disposing the other electrode so as to face the electrode with film formed thereon,
   pouring a low-viscosity electrolyte into a space between the opposed electrodes,
   and dissolving or swelling the polymeric binder in the electrolyte to form a gel electrolyte layer containing the white scattering material and the polymeric binder within the space.

2. The process for producing an electrochemical display element of claim 1, wherein the film which comprises the white scattering material and the polymeric binder is formed from a pasting liquid comprising the white scattering material, the polymeric binder and a solvent.

3. The process for producing an electrochemical display element of claim 2, wherein the film containing a white scattering material and a polymeric binder is formed by a step comprising at least one method of a coating method, an inkjet method, a printing method and a dispensing method.

4. The process for producing an electrochemical display element of claim 2, comprising steps of:
   evaporating a solvent from the film formed by the pasting liquid; and
   pouring a low-viscosity electrolyte.

5. The process for producing an electrochemical display element of claim 4, comprising steps of:
   evaporating a solvent from the film formed by the pasting liquid;
   forming a seal portion by printing a heat curable or ultraviolet ray curable resin around at least one electrode in opposed electrodes;
   sticking the opposed electrodes;
   forming a cell by curing; and
   pouring a low-viscosity electrolyte.

6. The process for producing an electrochemical display element of claim 1, wherein the film containing a white scattering material and a polymeric binder is porous.

7. The process for producing an electrochemical display element of claim 1, wherein the film containing a white scattering material and a polymeric binder is patterned.

8. The process for producing an electrochemical display element of claim 1, wherein the polymeric binder is a butyral resin.

9. The process for producing an electrochemical display element of claim 8, wherein a number of a PVA group represented by (A) of the butyral resin is in the range of 15% or more to 25% or less of a sum number of a PVAc group represented by (B) and PVB group represented by (C):

(A) PVA group

—CH$_2$—CH(OH)—

(B) PVAc group

—CH$_2$—CH(OCOCH$_3$)—

(C) PVB group $$-CH_2-CHCH_2\underset{\underset{C_3H_7}{|}}{\overset{}{\underset{OCH-O}{\diagdown\diagup}}}CH-.$$

10. The process for producing an electrochemical display element of claim 8, wherein an average degree of polymerization of the butyral resin is in the range of 400 to 800.

11. An electrochemical display element produced by the process of claim 1.

12. The electrochemical display element of claim 11, wherein the gel electrolyte layer contains a carboxylic acid ester compound.

13. The electrochemical display element of claim 11, wherein the gel electrolyte layer contains silver or a compound having silver in a chemical structure; and the opposed electrodes is driven so as to cause a dissolution and a precipitation of silver.

14. The electrochemical display element of claim 13, wherein the gel electrolyte layer contains at least one of a compound represented by Formula (1) or Formula (2):

$$R_1-S-R_2 \qquad \text{Formula (1)}$$

wherein $R_1$ and $R_2$ each represent a substituted or an unsubstituted hydrocarbon group, provided that an aromatic group is not included when $R_1$ and $R_2$ each forms a ring having S atom;

$$\text{Formula (2)}$$

wherein M represents a hydrogen atom, metal atom or a tertiary ammonium, Z represents a heterocyclic ring excluding an imidazole rings, n represents an integer of 0 to 5, R3 represents a hydrogen atom, a halogen atom, an alkyl group, an alkyl carbonamide group, an aryl carbonamide group, an alkyl sulfonamide group, an aryl sulfonamide group, an alkoxy group, an aryloxy group, an alkylthio group, an alkyl carbamoyl group, an aryl carbamoyl group, a carbamoyl group, an alkyl sulfamoyl group, an aryl sulfamoyl group, a sulfamoyl group, a cyano group, an alkyl sulfonyl group, an aryl sulfonyl group, an alkoxy carbonyl group, an aryloxy carbonyl group, an alkyl carbonyl group, an aryl carbonyl group, an acyloxy group, a carboxyl group, a carbonyl group, a sulfonyl group, an amino group, a hydroxyl group, or a heterocyclic group; when n is 2 or more, each R3 may be the same or different and may be joined to form a condensed ring.

15. The electrochemical display element of claim 13, wherein Equation (1) is satisfied:

$$0 \leq [X]/[Ag] \leq 0.01 \qquad \text{Equation (1)}$$

wherein [X] (mol/kg) represents a molar concentration of a halogen ion or a halogen atom contained in the gel electrolyte layer, and [Ag] (mol/kg) represents a molar concentration of a silver or a compound having silver in a chemical structure in the gel electrolyte layer.

16. The electrochemical display element of claim 13, wherein an electrochromic compound, a silver chloride compound and the white scattering material are included in the gel electrolyte layer between opposed electrodes, and substantive multi color of three colors or more comprising black, white and colored display other than black is displayed by a driving operation of the opposed electrodes.

17. The electrochemical display element of claim 16, comprising the electrochromic compound represented by Formula (3):

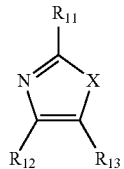

Formula (3)

wherein $R_{11}$ represents a substituted or unsubstituted aryl group, $R_{12}$ and $R_{13}$ each represents a hydrogen atom or a substituent, X represents >N—$R_{14}$, an oxygen atom or a sulfur atom, $R_{14}$ represents a hydrogen atom or a substituent.

* * * * *